United States Patent
Yaman et al.

(10) Patent No.: US 11,933,605 B2
(45) Date of Patent: Mar. 19, 2024

(54) ESTIMATING CORE-CLADDING CONCENTRICITY ERROR IN OPTICAL FIBERS USING GUIDED ACOUSTIC-WAVE BRILLOUIN SCATTERING

(71) Applicant: NEC Laboratories America, Inc., Princeton, NJ (US)

(72) Inventors: Fatih Yaman, Princeton, NJ (US); Hussam Batshon, Monroe, NJ (US); Shinsuke Fujisawa, Princeton, NJ (US); Kohei Nakamura, Tokyo (JP); Takanori Inoue, Tokyo (JP); Eduardo Mateo Rodriguez, Tokyo (JP); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/577,315

(22) Filed: Jan. 17, 2022

(65) Prior Publication Data
US 2022/0228859 A1    Jul. 21, 2022

Related U.S. Application Data
(60) Provisional application No. 63/139,373, filed on Jan. 20, 2021.

(51) Int. Cl.
*G01B 11/27* (2006.01)
*G01M 11/00* (2006.01)

(52) U.S. Cl.
CPC .......... *G01B 11/272* (2013.01); *G01M 11/33* (2013.01)

(58) Field of Classification Search
CPC ............................. G01B 11/272; G01M 11/33
See application file for complete search history.

(56) References Cited

U.S. PATENT DOCUMENTS

| | | | | |
|---|---|---|---|---|
| 10,761,270 B2 * | 9/2020 | Ott | .................. | G02B 6/3806 |
| 10,996,397 B2 * | 5/2021 | Zheng | .................. | G02B 6/2555 |
| 11,221,209 B2 * | 1/2022 | Zadok | .................. | G02B 6/1225 |

* cited by examiner

*Primary Examiner* — Abdullahi Nur
(74) *Attorney, Agent, or Firm* — Joseph Kolodka

(57) ABSTRACT

Aspects of the present disclosure describe estimating/measuring core-cladding concentricity error in optical fibers. In sharp contrast to the prior art, our inventive method is based on measuring a seemingly unrelated property of fibers called guided acoustic wave Brillouin scattering (GAWBS). As we shall show and describe, by analyzing this GAWBS property we advantageously determine what level of CCCE is exhibited by the optical fiber.

1 Claim, 16 Drawing Sheets

ESTIMATING CORE-CLADDING CONCENTRICITY ERROR IN OPTICAL FIBERS USING GUIDED ACOUSTIC-WAVE BRILLOUIN SCATTERING

CROSS REFERENCE TO RELATED APPLICATIONS

This application claims the benefit of U.S. Provisional Patent Application Ser. No. 63/139,373 filed 20 Jan. 2021 the entire contents of which is incorporated by reference as if set forth at length herein.

TECHNICAL FIELD

This disclosure relates generally to optical fiber communications. More particularly, it pertains to estimating core-cladding concentricity error in optical fibers using guided acoustic-wave Brillouin scattering (GAWBS).

BACKGROUND

As will be understood by those skilled in the art, optical fibers play an increasingly important role in contemporary communications as they are used to guide optical signals inside an optical core which is typically located along a central axis of the optical fiber. Typically, most of an optical field is confined in the core, but a relatively smaller portion is guided outside of the core. As is appreciated, optical fibers are designed and manufactured such that a cladding overlying the core, and the core have their centers coincide, therefore they are concentric and align axially.

How well the central axis of the core and the cladding align is known in the art as concentricity, and an offset in this alignment is known as core-cladding concentricity error (CCCE). One important reason that the core is centered in the cladding is that it makes splicing two fibers much easier. If CCCE is large, it can lead to large splicing losses, or it requires expensive splicing equipment and can also increase connector losses. Importantly, an accurate measurement of CCCE is necessary to maintain optical fiber quality and ensure that optical fibers satisfy product requirements.

SUMMARY

An advance in the art is made according to aspects of the present disclosure directed to estimating/measuring core-cladding concentricity error in optical fibers. In sharp contrast to the prior art, our inventive method is based on measuring a seemingly unrelated property of fibers called guided acoustic wave Brillouin scattering (GAWBS). As we shall show and describe, by analyzing this property we advantageously determine what level of CCCE is exhibited by the optical fiber.

As we shall show and will be readily appreciated by those skilled in the art, our inventive measurement method provides the following advantages over prior art methods. First, light remains in the optical fiber at all times, therefore our method advantageously measures the optical mode-field distribution inside the optical fiber, and not at the fiber/air interface, or other perturbation points to the fiber. Therefore, it is a more accurate representation of the optical mode-field distribution within the optical fiber.

Second, since the light always remain in the optical fiber, it doesn't require complicated fiber preparation procedures that are required for prior art measurement methods that are done in free-space.

Finally, our inventive method does not measure the mode-field distribution at a single point, but it provides the average of the mode-field distribution along the length of the fiber that is measured, thereby providing a more accurate characterization of the optical fiber.

BRIEF DESCRIPTION OF THE DRAWING

A more complete understanding of the present disclosure may be realized by reference to the accompanying drawing in which:

FIG. 4(A), $(s_{rr}+s_{\varphi\varphi})$ created by $TR_{1m}$ mode with m=12 with its amplitude normalized to 1; FIG. 4(B), same as 4(A) with the optical mode shown with contour lines at the center, i.e., CCCE=0; FIG. 4(C), same as 4(B) but CCCE=5 µm; effective area is 150 µm$^2$, x- and y-axis are normalized to cladding diameter all according to aspects of the present disclosure;

FIG. 5(A), amplitude cross-section of $(s_{rr}+s_{\varphi\varphi})$ created by $TR_{1m}$ mode with m=12 at y=0; FIG. 5(B), same as 5(A) with one line showing the optical mode distribution cross-section at y=0 with CCE=0; FIG. 5(C), same as 5(B) but CCCE=5 µm, effective area is 150 µm$^2$, x-axis is normalized to cladding diameter all according to aspects of the present disclosure;

FIG. 11(A) and FIG. 11(B) are schematic block diagrams illustrating procedures for determining CCCE by performing a best fitting between theory and measurement in which: FIG. 11(A), when both parallel and orthogonal GAWBS spectra are used; and FIG. 11(B), when only orthogonal GAWBS spectrum is used, all according to aspects of the present disclosure.

Figure 1:
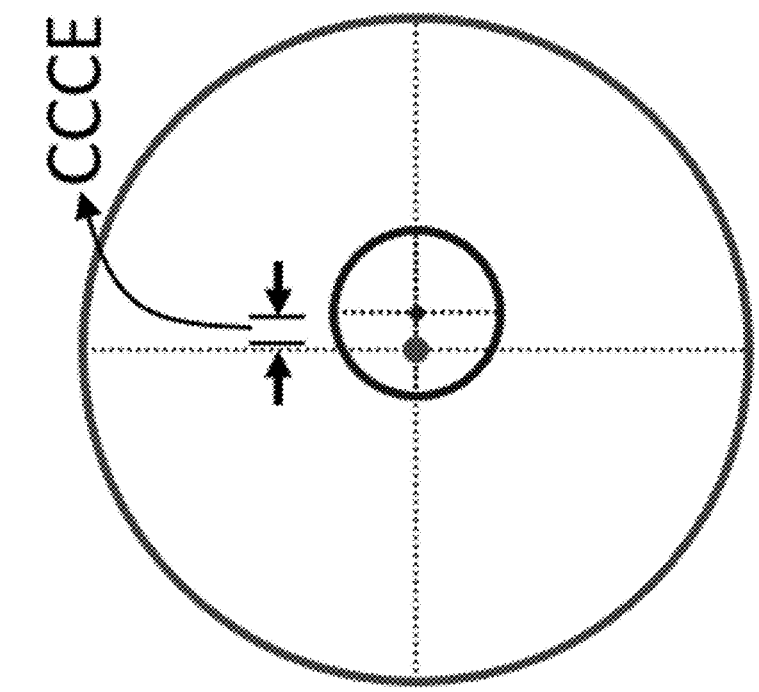
FIG. 1 is a schematic diagram of an illustrative cross section of a single-core fiber showing the cladding the outline core both in alignment (left) and exhibiting concentricity error (right)
Figure 1:
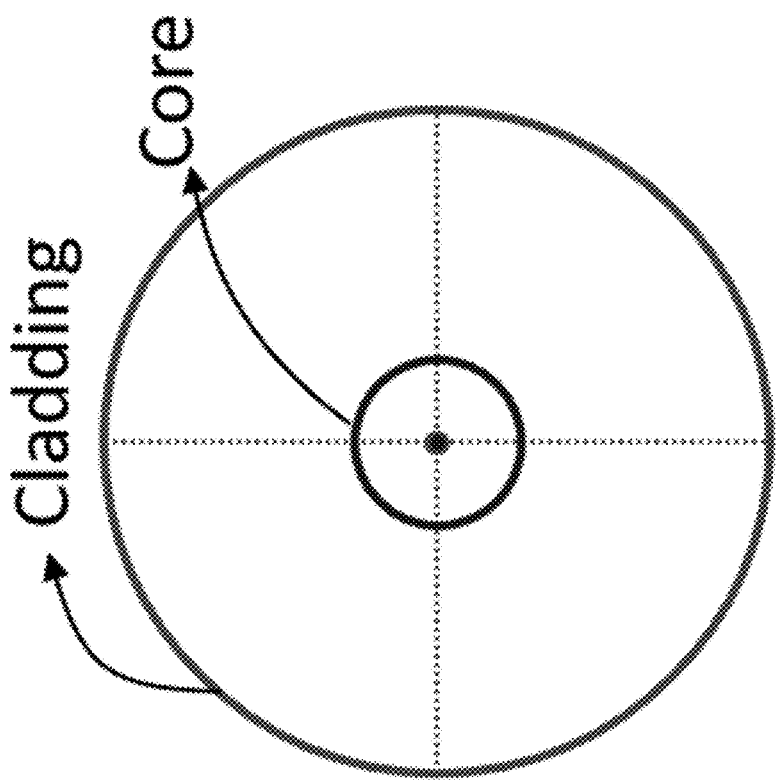

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawings are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

By way of some additional background, we begin by noting that there presently are several standards for measuring the CCCE in single-core fibers, such as IEC 60793-1-20:2014. These methods rely on either near-field or far-field imaging of the fiber either in the cross-section or by illuminating on the side. Other methods induce fluorescence inside the core using UV light and determine the core location by detecting the emitted light. Still other methods are known that illuminate the fiber from multiple angles.

Unfortunately, however, there are numerous infirmities with these measurement techniques. First, all these prior-art techniques are single point measurements. It is assumed that the fiber is uniform, and a measurement at a single point is a good representation of the distribution along a long fiber.

Second, it is cumbersome to prepare measurement set up for these methods. For instance, a fiber polymer coating needs to be removed, and the fiber needs to be cleaved, such that the fiber facet is perpendicular to the fiber axis and flat. As a result, these prior art methods are labor intensive, expensive, and difficult to replicate.

We note that one fiber communications system that requires a thorough characterization is a submarine optical transmission system, also known as a submarine cable system. As will be understood by those skilled in the art, submarine cables are the true backbone of communications in the world. Nearly all data that travels across continents is delivered through these cables laid on the seabed.

As those skilled in the art will understand and appreciate, there are several characteristics of submarine transmission that sets it apart from other fiber communication systems. First, they are very long, as they typically connect different continents. Second, they are very expensive to deploy given the difficulty of laying cables under water and the inherent cost of sufficiently reliable/durable cable. Also, once a submarine cable is deployed it is extremely expensive to replace, upgrade, or repair. Consequently, even small degradations in performance accumulate and cause a reduction in available transmission capacity.

One source of degradation is nonlinear impairments that occur in fiber during long distance transmission. The level of fiber nonlinearity depends on several parameters of optical fibers such as fibers effective area, nonlinear index, and fiber dispersion—among others. Nonlinear index is a material property of glass used for making the fiber. Fiber dispersion is determined mostly by the glass' material dispersion and waveguide characteristics which includes optical mode field distribution.

Probably the largest differentiator between different optical fibers in terms of their nonlinearity is their effective area. Effective area is directly related to the mode field distribution. It is effectively the area where optical power is significant. Therefore, being able to determine the effective area of an optical fiber is very critical in determining the how much nonlinear impairment is to be expected from a given optical fiber.

In optical fibers, the mode field diameter, and therefore the optical fiber effective area may vary along the same span of an optical fiber. Alternatively, it may vary span to span. What largely matters for overall optical fiber nonlinear impairment is the average of the effective area, especially if the variation is not too large. As a result, it is desirable to have a measurement technique that can measure the average effective area of an entire span, or even the entire transmission length is preferable to other prior art methods. This is in sharp contrast to certain methods that measure the effective are of the fiber locally, for many points and then average over the measurements.

We now describe: 1) How to measure GAWBS accurately; 2) our theory about how CCCE affects the GAWBS spectrum, and how the level of CCCE can be deduced from the measurement; and 3) example measurement results according to aspects of the present disclosure.

As noted—and according to an aspect of the present disclosure—we measure a mode-field distribution indirectly by measuring the guided acoustic Brillouin scattering (GAWBS) spectrum first, and estimating the distribution from the GAWBS spectrum.

As we shall show and will be readily appreciated by those skilled in the art, our inventive measurement method provides the following advantages over prior art methods. First, light remains in the optical fiber at all times, therefore our method advantageously measures the optical mode-field distribution inside the optical fiber, and not at the fiber/air interface, or other perturbation points to the fiber. Therefore, it is a more accurate representation of the optical mode-field distribution within the optical fiber.

Second, since the light always remain in the optical fiber, it doesn't require complicated fiber preparation procedures that are required for prior art measurement methods that are done in free-space.

Finally, our inventive method does not measure the mode-field distribution at a single point, but it provides the average of the mode-field distribution along the length of the fiber that is measured, thereby providing a more accurate characterization of the optical fiber.

Figure 2:
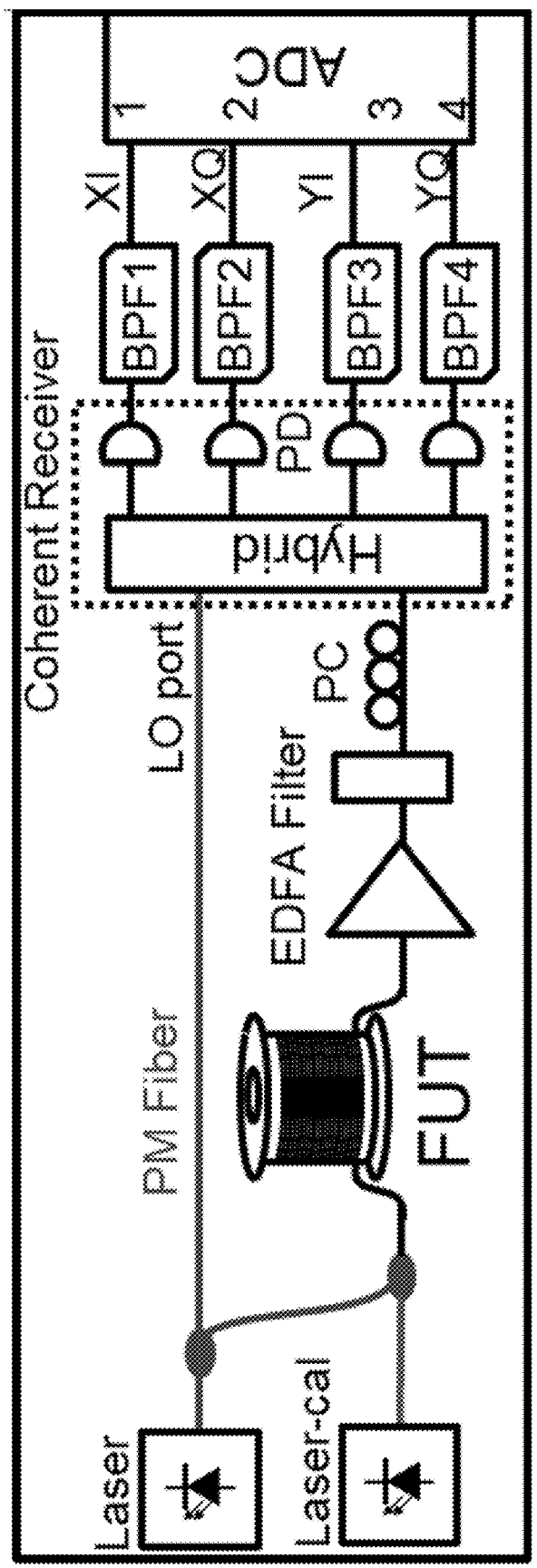
FIG. 2 is a schematic diagram of an illustrative measurement configuration for GAWBS according to aspects of the present disclosure.

FIG. 2 shows a schematic of an illustrative measurement set up/configuration that may be used for measuring GAWBS spectrum. As it can be observed from this light always remain in fiber until it reaches the photodetectors. Laser light is sent through the fiber under test (FUT).

In the optical fiber, there are ever present acoustic waves due to thermal fluctuations. These acoustic waves modulate the refractive index of the glass, in particular the acoustic waves bouncing back and forth between the glass/polymer-coating interface perpendicular to the direction of the light create the GAWBS spectrum. Due to the confining structure of the optical fiber, these modes present as modes, called GAWBS modes. These modes modulate the refractive index of the signal and create side tones at the same frequencies as the acoustic frequencies. These side tones give rise to a spectrum that looks like the cartoon representation shown in FIG. 3.

Figure 3:
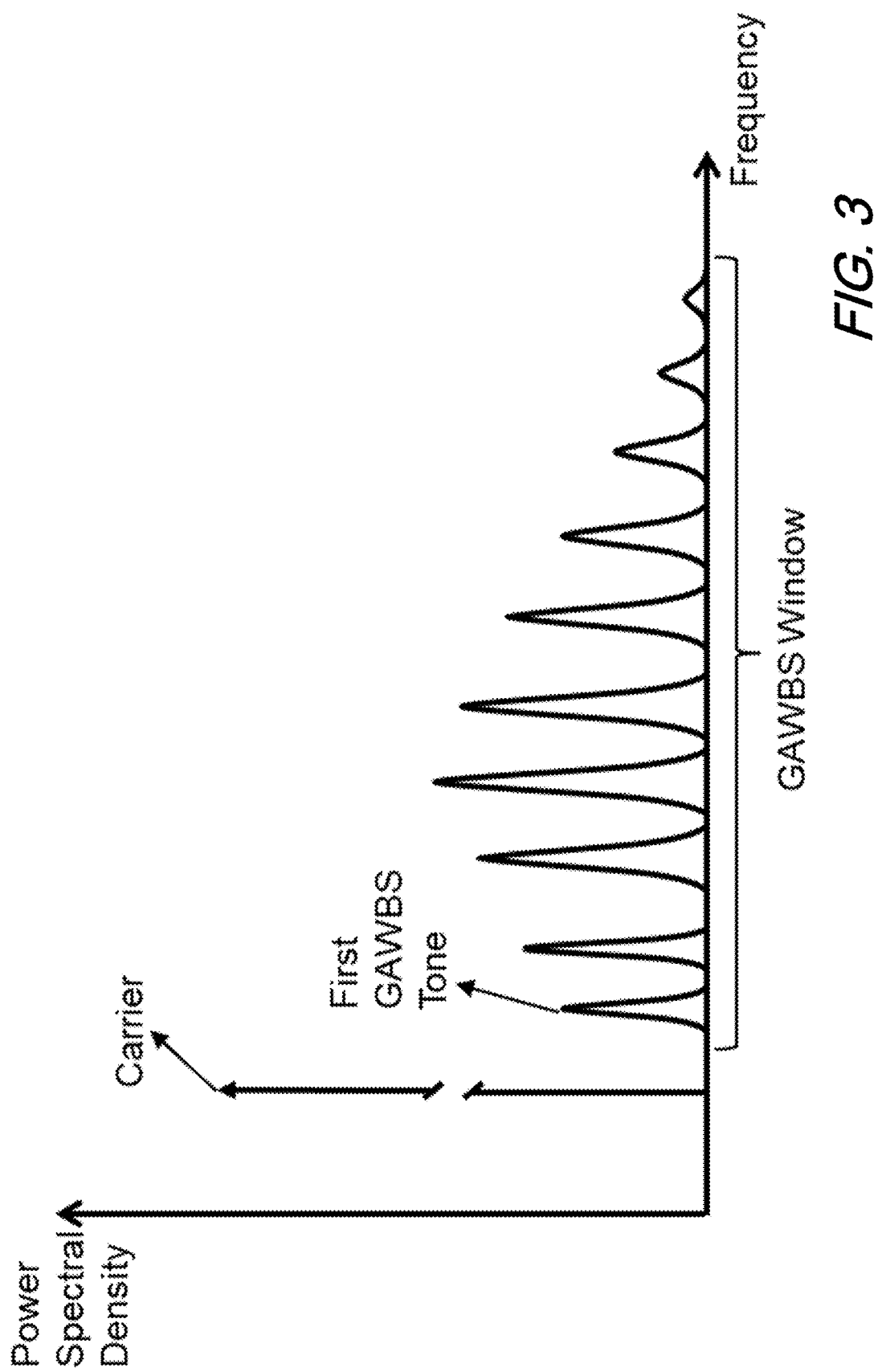
FIG. 3 is a plot of an illustrative GAWBS spectrum in which the carrier is laser light directed to a fiber under test (FUT) and the broken line indicates that the carrier is much larger than the GAWBS tones, according to aspects of the present disclosure.

As it can be seen in this FIG. 3, GAWBS creates discrete frequency peaks. The location of these peaks depends on optical fiber glass parameters, such as speed of longitudinal, and shear sound waves in glass and fiber cladding diameter. Overall magnitude of the peaks depends on fiber parameters such as, refractive index, glass density, photo-elastic coefficients of the glass, temperature and length of the fiber. Finally, the shape of the spectrum, in other words the relative power levels of the peaks with respect to one another depends only on the optical mode field distribution. Therefore, even if we don't obtain a good measurement value, or estimates of many of the fiber parameters such the cladding diameter, refractive index, photo-elastic parameters, speed of sound in the glass, temperature, glass density, etc., advantageously we can still determine the mode-field distribution from the shape of the spectrum.

We note that the spectral shape only depends on the optical mode distribution depends on several assumptions that are well satisfied for many typical fibers, which are as follows. First, the presence of the core does not affect the acoustic mode distribution significantly. In other words, the acoustic modes of the optical fiber remain the almost same whether the optical fiber has a core in the middle or not. This is well satisfied especially for most typical optical fibers where the core is only lightly doped, and the refractive index difference between the core and the cladding is small. Finally, the polymer coating doesn't impact different acoustic modes too differently. This is also well satisfied for most typical fibers where the glass/polymer coating interface creates a high impedance mismatch for the acoustic mode.

Note that, the GAWBS spectrum measurement gives the location of the peaks which can be used as an additional means to increase the accuracy of the measurements. For instance, even though the speed of sound is well documented in the fiber, and the cladding diameter is typically well known, one can eliminate one of these parameters which may have the lower confidence based on the exact measured spectral locations of the GAWBS peaks.

Under these assumptions, each peak can be identified as originating from a particular acoustic mode. The shape of the acoustic modes can be calculated from the fiber parameters as we will now describe.

Theoretical Background for GAWBS Spectrum and how it is Related to CCCE

GAWBS is generated by transverse acoustic modes in an optical fiber. These modes do not have any longitudinal components, which means that they only generate forward scattering. The acoustic frequencies allowed by a given fiber can be found through solving the following characteristic equation for y $$|B|=0 \qquad (5)$$

where $|\cdot|$ stands for determinant and B is 2×2 matrix given by $$\begin{bmatrix} \left(n^2 - 1 - \frac{y^2}{2}\right)J_n(\alpha y) & \left(n(n^2-1) - \frac{y^2}{2}\right)J_n(y) - \\ & (n^2-1)t = yJ_{n+1}(y) \\ (n-1)J_n(\alpha y) - \alpha y J_{n+1}(\alpha y) & \left(n(n-1) - \frac{y^2}{2}\right)J_n(y) + yJ_{n+1}(y) \end{bmatrix} \qquad (6)$$

where $y=2\pi f\alpha/V_s$, $\alpha=V_s/V_d$, $V_s$ is the shear sound velocity, $V_d$ is the longitudinal sound velocity, and f is the vibration frequency sound wave, a is the fiber cladding radius, and n is an integer that denotes solutions for different acoustic mode groups.

For each n, Eqs(5-6) has discrete solutions that can be numbered with integers m. The acoustic modes can be described by the displacement vector fields for these modes which are given by:

$$U_r(r, t) = \qquad (7)$$
$$C_{nm} \frac{y_{nm}}{a} \left\{ -A_2 \left[ \frac{an}{r} J_n\left(\frac{\alpha y_{nm} r}{a}\right) - \alpha J_{n+1}\left(\frac{\alpha y_{nm} r}{a}\right) \right] + A_1 \frac{na}{r} J_n\left(\frac{y_{nm} r}{a}\right) \right\}$$
$$\cos(n\varphi) \sin(\Omega_{nm} t)$$

$$U_\varphi(r, t) = C_{nm} \frac{y_{nm}}{a} \left\{ -A_1 \left[ \frac{an}{r} J_n\left(\frac{y_{nm} r}{a}\right) - J_{n+1}\left(\frac{y_{nm} r}{a}\right) \right] + A_2 \frac{na}{r} J_n\left(\frac{\alpha y_{nm} r}{a}\right) \right\}$$
$$\sin(n\varphi) \sin(\Omega_{nm} t)$$

where $A_1=nB_{11}$, $A_2=B_{12}$, $\overline{U}=[U_r, U_\varphi, 0]$ is the displacement vector field in cylindrical coordinates defined by radial, and angular coordinates r and φ, respectively, and $C_{nm}$ is the amplitude of the corresponding mode, $\Omega_{nm}=2\pi f_{nm}$, $f_{nm}$ are the discrete frequencies that satisfy the characteristic equation given by Eq. (6). Note that we may drop the time dependent portion when opt relevant.

The acoustic vibrations cause a strain tensor in the cross plane of the fiber which in turn creates modulation of the refractive index of the fiber. The non-zero strain tensor components can be found by the following relations:

$$S_{rr} = \frac{\partial U_r}{\partial r} \qquad (8)$$

$$S_{\varphi\varphi} = \frac{1}{r} \frac{\partial U_\varphi}{\partial \varphi} + \frac{U_r}{r}$$

-continued $$S_{r\varphi} = \frac{1}{2}\left(\frac{1}{r}\frac{\partial U_r}{\partial \varphi} + \frac{\partial U_\varphi}{\partial r} - \frac{U_\varphi}{r}\right)$$

Note that tensor components in z axis is zero. Inserting Eq(7) into Eq(8), we obtain $$S_{rr} = C_{mn}\left(\frac{y_{mn}}{a}\right)^2\left\{-A_2\left[\frac{n(n-1)}{\rho^2}J_n(\alpha\rho) - \frac{(2n+1)\alpha}{\rho}J_{n+1}(\alpha\rho) + \alpha^2 J_{n+2}(\alpha\rho)\right] + A_1\left[\frac{n(n-1)}{\rho^2}J_n(\rho) - \frac{n}{\rho}J_{n+1}(\rho)\right]\right\}\cos n\varphi \quad (9)$$

$$S_{\varphi\varphi} = C_{nm}\left(\frac{y_{mn}}{a}\right)^2\frac{1}{\rho}\left\{A_2\left[\frac{n}{\rho}J_n(\alpha\rho) + \alpha J_{n+1}(\alpha\rho)\right] - A_1\left[\frac{n}{\rho}J_n(\rho) - 2J_{n+1}(\rho)\right]\right\}\cos n\varphi$$

$$S_{r\varphi} = C_{mn}\left(\frac{y_{mn}}{a}\right)^2\frac{1}{2\rho}\left\{A_2\left[\frac{n^2}{\rho}J_n(\alpha\rho) - (n+2)\alpha J_{n+1}(\alpha\rho)\right] - A_1\left[\frac{n^2}{\rho}J_n(\rho) - 2nJ_{n+1}(\rho) + \rho J_{n+2}(\rho)\right]\right\}\sin n\varphi$$

where $=y_{nm}r/a$. In order to find the level of change in the refractive index due to the strain induced by the acoustic vibrations we use the photo-elastic relation for isotropic materials in the reduced notation that relates the strain tensor to the impermeability tensor as follows which is given in the Cartesian coordinates as follows.

$$\begin{bmatrix} \Delta\eta_{xx}(r,\varphi) \\ \Delta\eta_{yy}(r,\varphi) \\ \Delta\eta_{zz}(r,\varphi) \\ \Delta\eta_{yz}(r,\varphi) \\ \Delta\eta_{xz}(r,\varphi) \\ \Delta\eta_{xy}(r,\varphi) \end{bmatrix} = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{11}-p_{12} & 0 & 0 \\ 0 & 0 & 0 & 0 & p_{11}-p_{12} & 0 \\ 0 & 0 & 0 & 0 & 0 & p_{11}-p_{12} \end{bmatrix}\begin{bmatrix} S_{xx}(r,\varphi) \\ S_{yy}(r,\varphi) \\ S_{zz}(r,\varphi) \\ S_{yz}(r,\varphi) \\ S_{xz}(r,\varphi) \\ S_{xy}(r,\varphi) \end{bmatrix} \quad (10)$$

where $$\Delta\eta_{ab}(r,\varphi) = \Delta\left(\frac{1}{\varepsilon_{ab}(r,\varphi)}\right) \approx -\frac{\Delta\varepsilon_{ab}(r,\varphi)}{\varepsilon_{ab}^2} \quad (11)$$

and $\varepsilon_{ab}$ are the components of the dielectric permittivity tensor, and the approximation on the right holds for small changes in the dielectric permittivity as is the case for GAWBS. From Eq. (10) we obtain $$\Delta\eta_{xx}(r,\varphi) = p_{11}S_{xx} + p_{12}S_{yy}$$

$$\Delta\eta_{yy}(r,\varphi) = p_{12}S_{xx} + p_{11}S_{yy}$$

$$\Delta\eta_{xy}(r,\varphi) = (p_{11}-p_{12})S_{xy} \quad (12)$$

We can write the strain tensor from the Cartesian coordinates to the cylindrical coordinates as follows:

$$S_{xx} = (\cos\varphi)^2 S_{rr} + (\sin\varphi)^2 S_{\varphi\varphi} - \sin 2\varphi S_{r\varphi}$$

$$S_{yy} = (\sin\varphi)^2 S_{rr} + (\cos\varphi)^2 S_{\varphi\varphi} + \sin 2\varphi S_{r\varphi}$$

$$S_{xy} = \sin 2\varphi(S_{rr} - S_{\varphi\varphi})/2 - \cos 2\varphi \quad (13)$$

Inserting Eq. (13) into Eq. (12) we can write the impermeability tensor components as follows:

$$\Delta\eta_{xx}(r,\varphi) = \frac{p_{11}+p_{12}}{2}(S_{rr}+S_{\varphi\varphi}) + \frac{p_{11}-p_{12}}{2}[(S_{rr}-S_{\varphi\varphi})\cos 2\varphi - 2S_{r\varphi}\sin 2\varphi]$$

$$\Delta\eta_{yy}(r,\varphi) = \frac{p_{11}+p_{12}}{2}(S_{rr}+S_{\varphi\varphi}) - \frac{p_{11}-p_{12}}{2}[(S_{rr}-S_{\varphi\varphi})\cos 2\varphi - 2S_{r\varphi}\sin 2\varphi]$$

$$\Delta\eta_{xy}(r,\varphi) = \frac{p_{11}-p_{12}}{2}[(S_{rr}-S_{\varphi\varphi})\sin 2\varphi - 2S_{r\varphi}\cos 2\varphi] \quad (14)$$

Note that the expression for $\Delta\eta_{ab}(r,\varphi)$ can be separated into two parts each of which only depends on r or $\varphi$. This can be noted by looking at Eq. (14) where the terms dependent on $\varphi$ are explicit, and moreover, it is clear from Eq. (9) that the strain tensor components can be separated into two parts that only depends on r or $\varphi$. We will do this more explicit by doing the following definition:

$$S_{rr}(r,\varphi) = s_{rr}(r)\cos n\varphi$$

$$S_{\varphi\varphi}(r,\varphi) = s_{\varphi\varphi}(r)\cos n\varphi$$

$$S_{r\varphi}(r,\varphi) = s_{r\varphi}(r)\sin n\varphi \quad (15)$$

We will eventually relate the changes in the permeability tensor to the refractive index changes. Eq. (14) describes how the impermeability tensor components vary across the fiber cross section due to the acoustic vibrations. In general, such spatial variations in the refractive index distribution would scatter the signal travelling in the fiber into all the modes supported by the optical fiber and radiation modes. When the index modulations are very small, power lost these scattering would be negligible, and not of interest to us. The non-negligible contribution would be to optical signal coupling into the modes supported by the fiber in the absence of acoustic vibrations. Though this analysis can be extended to multi-mode fibers, here we will limit the analyses to single moded fibers. In this case the available modes are the two orthogonal polarization modes. We can expand the optical field in these two modes as follows:

$$\vec{E}(r,z,t) = f(r)[h_x(z)\hat{e}_x + h_y(z)\hat{e}_y]e^{-i(kz-\omega t)} \quad (16)$$

In Eq. (16) we expanded the electric field of the optical mode in terms of the two polarization modes aligned along the unit vectors $\hat{e}_x$ and $\hat{e}_y$. Here the assumption is that the fiber is single moded with a propagation constant of $k = n_0 k_0 = 2\pi n_0/\lambda$, where $n_0 = \sqrt{\varepsilon}$ is the refractive index of the fiber without the acoustic perturbation, and $\varepsilon$ is the corresponding dielectric permittivity, and $k_0$ is the. Fiber's intrinsic anisotropy is neglected, and same propagation constant is assumed for both polarization modes. Moreover, it is assumed that both polarizations have the same mode field distribution in the transverse direction f(r). It is further assumed that the optical mode is radially symmetric. Since r is defined from the center of the cladding, this could only be true if core-cladding concentricity is zero. What would happen in the case of non-zero CCCE will be discussed later. Note that, in Eq. (16), the longitudinal component of the optical mode is not included even though in general it is not zero, even though it is typically small. This is warranted as the z-components of the permeability tensors vanish anyways since the acoustic modes we are looking are transverse modes. However, because of the acoustic vibrations, the evolution of the two polarizations along the fiber, i.e., in the z-axis is given by two separate functions, which allows for coupling of the two polarizations components to one another as well back to themselves. The coupled mode equations for the optical mode can be written as follows:

$$\frac{\partial h_a(z)}{\partial z} = i \sum_{b=x,y} \kappa_{ij} h_j(z), a = x, y, i = \sqrt{-1} \quad (17)$$

where the coupling coefficients $k_{ij}$ are given by:

$$\kappa_{ab} = \frac{k_0}{2\sqrt{\varepsilon}} \frac{\int_0^{2\pi} \int_0^{\infty} \Delta\varepsilon_{ab}(r,\varphi) f(r)^2 r dr d\varphi}{\int_0^{2\pi} \int_0^{\infty} f(r)^2 r dr d\varphi} \quad a,b = x,y \quad (18)$$

Eq. (17) is the central equation to our claims. One can see that the coupling coefficients are just a normalized overlap integral between the optical mode field distribution and the strain distribution caused by the acoustic vibrations. Since we know the strain distribution generated by the acoustic vibrations as shown in Eq. (9), though we would know their overlap with the optical mode field.

We can rewrite Eq. (18) as follows by using the definition in Eq. (15):

$k_{xx} \propto p_p \int_0^{2\pi} \cos(n\phi) d\phi \int_0^{\infty} (s_{rr}+s_{\phi\phi})f(r)^2 dr + p_m \sim_0^{2\pi} \cos(n\phi) \cos(2\phi) d\phi \int_0^{\infty} (s_{rr}-s_{\phi\phi})f(r)^2 dr + 2p_m \sim_0^{2\pi} \sin(n\phi) \sin(2\phi) d\phi \int_0^{\infty} s_{r\phi}f(r)^2 r dr$ (19)

$k_{yy} \propto p_p \int_0^{2\pi} \cos(n\phi) d\phi \int_0^{\infty} (s_{rr}+s_{\phi\phi})f(r)^2 r dr - p_m \int_0^{2\pi} \cos(n\phi) \cos(2\phi) d\phi \int_0^{\infty} (s_{rr}-s_{\phi\phi})f(r)^2 r dr - 2p_m \int_0^{2\pi} \sin(n\phi) \sin(2\phi) d\phi \int_0^{\infty} s_{r\phi}f(r)^2 r dr$ (20)

$k_{xy} \propto p_m \int_0^{2\pi} \cos(n\phi) \sin(2\phi) d\phi \int_0^{\infty} (s_{rr}-s_{\phi\phi})f(r)^2 r dr - 2p_m \int_0^{2\pi} \sin(n\phi) \cos(2\phi) d\phi \int_0^{\infty} s_{r\phi}f(r)^2 r dr$ (21)

where $p_p=(p_{11}+p_{12})/2$, and $p_m=(p_{11}-p_{12})/2$, and only the integration in numerator in Eq. (18) is shown as the integral in denominator just a normalization factor by the total power in the optical mode. We can see that in Eq. (21), which creates coupling between the two polarizations, all the integrals over ($_13$ (angular integrals) vanishes for any integer n. This is only true when we choose the x- and y-polarizations in the same axis defined by the angle φ. Angular integrals in Eq. (19-20) do not vanish only for two values of n: n=0, and n=2. For n=0, the angular integrals in the first terms on the right is just 2π as the cosine term is just 1, for both Eqs. (17) and (18). However, the angular integrals in the second and third terms vanish. For the case of n=2, on the other hand, the first terms on the right vanish, and the second and third angular integrals are just π. Therefore we can simplify Eqs. (19-20) as follows:

$$n = 0: \kappa_{yy} = \kappa_{xx} = \kappa_p = \frac{k_0 n_0^3}{2} \frac{p_p \int_0^{\infty}(s_{rr}+s_{\varphi\varphi})f(r)^2 r dr}{\int_0^{\infty} f(r)^2 r dr} \quad (22)$$

$$n = 2: -\kappa_{yy} = \kappa_{xx} = \kappa_u = \frac{k_0 n_0^3}{4} \frac{p_m \int_0^{\infty}(s_{rr}-s_{\varphi\varphi}+2s_{r\varphi})f(r)^2 r dr}{\int_0^{\infty} f(r)^2 r dr}$$

where we used the approximation in Eq.(11) and the definition $n_0 = \sqrt{\varepsilon}$.

Combining Eqs. (16,17,20) we obtain n=0: $\vec{E}(r, z, t) = f(r)[h_x(0)\hat{e}_x + h_y(0)\hat{e}_y]e^{-i(kz-\omega t)}e^{ik_p(t)z}$ n=2: $\vec{E}(r, z, t) = f(r)[h_x(0)e^{ik_u(t)z}\hat{e}_x + h_y(0)e^{-ik_u(t)z}\hat{e}_y]e^{-i(kz-\omega t)}$ (23)

We can see from Eq. (23) that in the case of n=0, optical field only experiences a phase modulation since the phase shift is the same for both polarizations. Therefore, the GAWBS peaks created by n=0 mode group which is also denoted as the $R_{0m}$ modes create only GAWBS peaks that are in the same polarization as the input optical field. Incidentally, these modes are called the radial modes, as they only generate vibrations in the form of radial dilation, and contraction. For the case of n=2, optical field experiences linear birefringence, in particular when the optical field has equal power in both x- and y-polarizations defined by the angle φ, the field experiences pure birefringence, and therefore GAWBS peaks occur orthogonal to the input optical field. When the input field is only in x-polarization or only in y-polarization, then the optical field again experience only a pure phase modulation. Therefore since in general the optical field polarization may be in random orientation, GAWBS peaks of both polarizations are created. Therefore these GAWBS peaks are also known as unpolarized GAWBS. Nevertheless, as we will show later that unpolarized does not mean zero degree of polarization. The acoustic mode group of n=2 is also given the name $TR_{2m}$, known as torsional-rotational modes.

In Eq. (23), we explicitly retain the time dependence of the coupling coefficients, since these coefficients are created by acoustic modes vibrating at frequencies. These frequencies can be found from Eq. (6). n=0, $$\left[\frac{y^2}{2}J_0(y) - yJ_1(y)\right]\left[\frac{y^2}{2}J_0(ay) - ayJ_1(ay)\right] = 0 \quad (24)$$

which gives two separate equations. The solutions of the equation in the first parenthesis belong to the mode group that is pre radial shear waves. Incidentally, the equation in the first parenthesis can be reduced to roots of the second order Bessel function. Shear waves do not contribute to GAWBS. This is because pure shear waves $U_r=0$, and, $U_\varphi(r)$ is a function of r only. Therefore it only produces off-diagonal strain, i.e., $S_{r\varphi}$ with no φ dependence. Looking at Eqs. (19-21) all the angular integrals would vanish under these conditions.

The solution to the equation in the second parenthesis belong to the pure radial dilational modes. We can find the acoustic frequencies satisfying this equation by relating them to the $ay_{om}$ that satisfied this equation as follow:

$$f_{0m} = \frac{y_{om} y_d}{2\pi a} \quad (25)$$

where we used $y = \frac{2\pi f a}{V_s}, \alpha = V_s/V_d$.

The frequencies of the $TR_{2m}$ modes can also be find in a similar fashion from Eq. (6) by setting n=2.

If the fiber core is concentric with the fiber cladding, only two mode groups contributes to the generation of the GAWBS spectrum: n=0 which is responsible for the so called-radial modes $R_{0m}$, and : n=2, which is responsible for the torsional-rotational modes $TR_{2m}$. Therefore we find that the acoustic modes vibrate at discrete frequencies, which in turn, generates strain in the fiber cross-section, and that in turn generates perturbation in the dielectric tensor, which causes coupling as shown in Eqs. (22-23). Since the coupling coefficients vary sinusoidally, they create side tones at the vibration frequencies. To find the magnitude of these side tones, We use Eq. (23), and show the time dependence portion explicitly:

$$n=0: \vec{E}(r, l, t) = f(r)[h_x(0)\hat{e}_x + h_y(0)\hat{e}_y]$$
$$e^{-i(kl-\omega t)} e^{ik_{p0}l \sin(\Omega_{0m}t)}$$

$$n=2: \vec{E}(r, l, t) = f(r)[h_x(0)e^{ik_{u0}l \sin(\Omega_{2m}t)}\hat{e}_x + h_y(0)$$
$$e^{-ik_{u0}t \sin(\Omega_{2m}t)}\hat{e}_y]e^{-i(kl-\Omega t)} \quad (26)$$

where we inserted the time dependence of the acoustic vibrations explicitly, assumed a short propagation length of l, and defined $k_{p0}$, and $k_{u0}$ as the maximum amplitude of the acoustic vibrations. Moreover, we ignored any additional phase in the time variation for simplicity. The time dependent term can be expanded using Bessel identity:

$$e^{ik_{p0}z \sin(\Omega_{0m}t)} = \Sigma_{v=-\infty}^{\infty} J_v(k_{p0}z)e^{ik_{p0}z\Omega_{0m}t} \approx 1 + ik_{p0}l \sin(\Omega_{0m}t) \quad (27)$$

where we assumed a short distance where $K_{p0}z \ll 1$. Equation (27) shows the amplitude of the side tones generated at the frequency $f_{0m}$. A similar expansion can be made for the $TR_{2m}$ modes. The average power of the GAWBS tones per unit length=can be found to be:

$$P_G(f_{0m}) = P_0 \langle | i\kappa_{p0} \sin(\Omega_{0m}t) |^2 \rangle_t = P_0 \frac{(\kappa_{p0})^2}{2} l_c \quad (28)$$

where $\langle \cdot \rangle_t$ stands for time averaging, $P_G$ ($f_{0m}$) is defined as the generated GAWBS power as a function of the GAWBS peak frequency per unit length, $P_0$ is the incident power, $l_c$ is the coherence length of the acoustic modes in the z-axis. $l_c$ is introduced without derivation. So far in the derivation, we assumed the acoustic modes have infinite wavelength in the z-axis, meaning the entire length of the fiber is vibrating coherently. However, this is not the case, and $l_c$ is assumed to be the length scale at which acoustic modes on average loosed their coherence along the fiber.

A similar analysis can be made for the $TR_{2m}$ modes, however, as it can be seen from Eq. (26), these modes do not generate a pure phase modulation. Therefore the GAWBS peaks will be generated at different polarizations. First we need to find out how these peaks are distributed among different polarizations. Using the approximation in Eq. (27), we can write the field for n=2 in Eq. (26) as follows:

$$\vec{E}(r, l, t) = f(r)e^{-i(kl-\omega t)}\{[h_x(0)\hat{e}_x + h_y(0)\hat{e}_y] - ik_{u0}l \sin(\Omega_{2m}t)[h_x(0)\hat{e}_x - h_y(0)\hat{e}_y]\} \quad (29)$$

Without loss of generality, we assume the following form:

$$h_x(0) = A \cos(\theta/2)e^{i\psi}, \text{ and } h_x(0) = A \sin(\theta/2) \quad (30)$$

where $\theta \in [0, \pi]$, $\psi \in [0, 2\pi]$ are arbitrary angles, and A is a complex amplitude, which can describe an arbitrary polarization of the optical field. Note that we are still assuming $\hat{e}_x$ and $\hat{e}_y$ are aligned in the reference frame defined by angle $\varphi$, which describes the angular dependence of the $TR_{2n}$ modes. We note that in Eq. (29), the term in the first square brackets is the original incident field, and the second term is the scattered GAWBS field. The GAWBS term is not necessarily parallel, or orthogonal to the incident optical field. We can separate it into two parts, one part parallel to that of the incident field, and one part orthogonal as follows:

$$[\cos(\theta/2)e^{i\psi}\hat{e}_x - \sin(\theta/2)\hat{e}_y] = \cos(\theta)[\cos(\theta/2)e^{i\psi}\hat{e}_x + \sin(\theta/2)\hat{e}_y] + \sin(\theta)[\sin(\theta/2)e^{i\psi}\hat{e}_x - \hat{e}_y\cos(\theta/2)] \quad (31)$$

In Eq.(31), the first term on the right is parallel to the incident optical field, and the second term is orthogonal. Equation-(31) shows that, when θ=0, meaning the incident optical field is along the x-axis, or when θ=π, meaning the incident field is along the y-axis, the GAWBS peaks are fully aligned with the incident optical field. However, for any other value of θ, there is non-zero contribution in orthogonal polarization. Note that the ellipticity angle plays no role. Moreover, when θ=π/2, GAWBS peaks are completely in orthogonal polarization to the incident field. Again this true regardless of the value of the ellipticity angle.

Note that in general the orientation of the incident optical field with respect to the reference frame of the acoustic modes is arbitrary, and it changes randomly along the fiber due to residual birefringence in fibers. Therefore we need to average the portion of the power of GAWBS that is parallel to the incident field $\sim (\cos(\theta))^2$ and that is orthogonal to the incident field $\sim (\sin(\theta))^2$, over the range of angles:

$$\frac{1}{4\pi} \int_0^{2\pi} d\psi \int_0^{\pi} (\cos(\theta))^2 \sin(\theta) \, d\theta = \frac{1}{3}, \quad (32)$$

$$\frac{1}{4\pi} \int_0^{2\pi} d\psi \int_0^{\pi} (\sin(\theta))^2 \sin(\theta) \, d\theta = \frac{2}{3}$$

We see from Eq. (32) that, on average, a third of the GAWBS power generated by $TR_{2m}$ modes will be parallel to the incident optical field, and two thirds will be orthogonal to it. In other words, The "unpolarized GAWBS" peaks will have twice as much power orthogonal to the incident field as they will have parallel to it. Even though they are called unpolarized, it should be understood as not-polarized, rather than completely depolarized.

The significance of being able to separate the parallel and orthogonal contributions of GAWBS is that, it helps identifying the GAWBS peaks. Some of the GAWBS peaks generated by $R_{0m}$ and peaks generated by $TR_{2m}$ overlap in frequencies. However, we just showed that $R_{0m}$ peaks do not contribute to orthogonal polarization. Therefore, one can measure both parallel, and orthogonal GAWBS peaks, and then subtract half of the orthogonally polarized GAWBS peaks from the parallel polarized peaks, to leave only parallel GAWBS peaks. This would remove all the $TR_{2m}$ contributions from the parallel GAWBS peaks whether the peak frequencies overlap or not.

Finally, the only remaining free parameter that is not determined so far is the $C_{mn}$ coefficients which also determined the shape of the GAWBS spectrum. In the absence of external drivers, the acoustic modes are excited by ambient thermal fluctuations. In steady state conditions, the equipartition theorem dictates that each acoustic mode equally shares the thermal energy which is equal to $k_B T$, where $k_B$ is the Boltzmann constant, and T is temperature in Kelvin. We can determine the $C_{mn}$ by calculating the energy of each acoustic mode as follows:

$$E_{mn} = \int_0^l \int_0^{2\pi} \int_0^a \frac{1}{2}\rho \Omega_{mn}^2 [U_r^2(r,\phi) + U_\phi^2(r,\phi)] r dr d\phi dz = k_B T \quad (33)$$

where $\rho$ is the glass density. For the case of n=0, we get:

$$C_{0m} = \frac{a}{y_{0m} V_d A_2} \left[\frac{k_B T}{\pi l \rho B_{0m}}\right]^{\frac{1}{2}} \text{ with } B_{0m} = \frac{J_0^2(y_{0m}) + J_1^2(y_{0m})}{2} - \frac{J_0(y_{0m})J_1(y_{0m})}{y_{0m}} \quad (34)$$

We can see from Eq. (34) that even though all acoustic modes have the same energy, they have varying magnitudes. Combining Eqs. (9,22,25,28) together we obtain:

$$P_G(f_{0m}) = C_0 \left[\int_0^1 S(\beta_m x) f^2(x) x dx\right]^2 \quad (35)$$

where, $$C_0 = \frac{P_0 k_0 n_0^3 p_p}{2a V_d l_c \int_0^1 f(x)^2 x dx} \sqrt{\frac{k_B T}{\pi l \rho}}, \quad (36)$$

$$s(\beta_m x) = \frac{J_0(\beta_m x)}{\sqrt{J_1^2(\beta_m) - J_0(\beta_m) J_2(\beta_m)}}, \quad \beta_m = \Omega_{0m} \frac{a}{V_d}$$

Now we can remove the condition assumed above (italicized), which is that CCCE is zero. In this case, since the optical mode is not centered in the cladding, and that it has an offset, it cannot be assumed circularly symmetric. In other words, at some angles optical mode is larger, which is the direction of the core offset compared to other angles. Therefore Eq.(18) needs to be changed to $$\kappa_{ab} = \frac{k_0}{2\sqrt{\varepsilon}} \frac{\int_0^{2\pi} \int_0^\infty \Delta\varepsilon_{ab}(r,\varphi) f(r,\varphi; x_0)^2 r dr d\varphi}{\int_0^{2\pi} \int_0^\infty f(r,\varphi; x_0)^2 r dr d\varphi} \quad a, b = x, y \quad (37)$$

Here without loss of generality, we assumed the core-cladding offset (CCO) is in the x axis by an amount $x_0$. With the CCCE non-zero, Eqs. (19-21) do not vanish anymore for the case of n=1. Moreover the value of these overlap integrals depend on $x_0$. It was found out that the overlap integrals producing pure phase noise, in other words polarized GAWBS, are larger by about 10 dB compared to the overlap integrals that produce birefringence which produce unpolarized GAWBS. Considering that only one third of the unpolarized GAWBS is aligned with the polarized GAWBS, we can neglect the impact of CCCE on the polarized GAWBS spectrum.

Figure 4A:
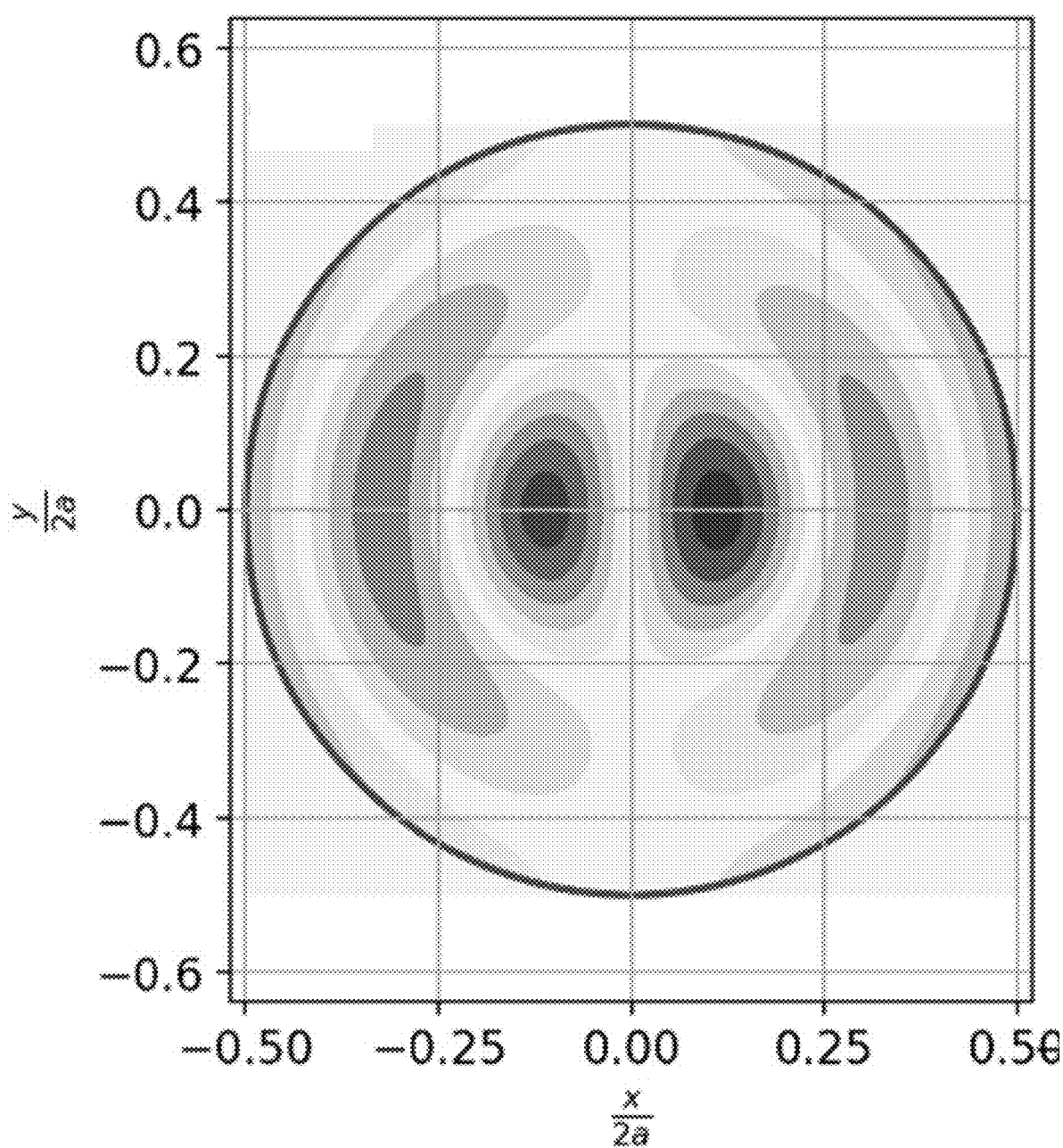
FIG. 4(A), FIG. 4(B), and FIG. 4(C) are plots illustrating.
Figure 4B:
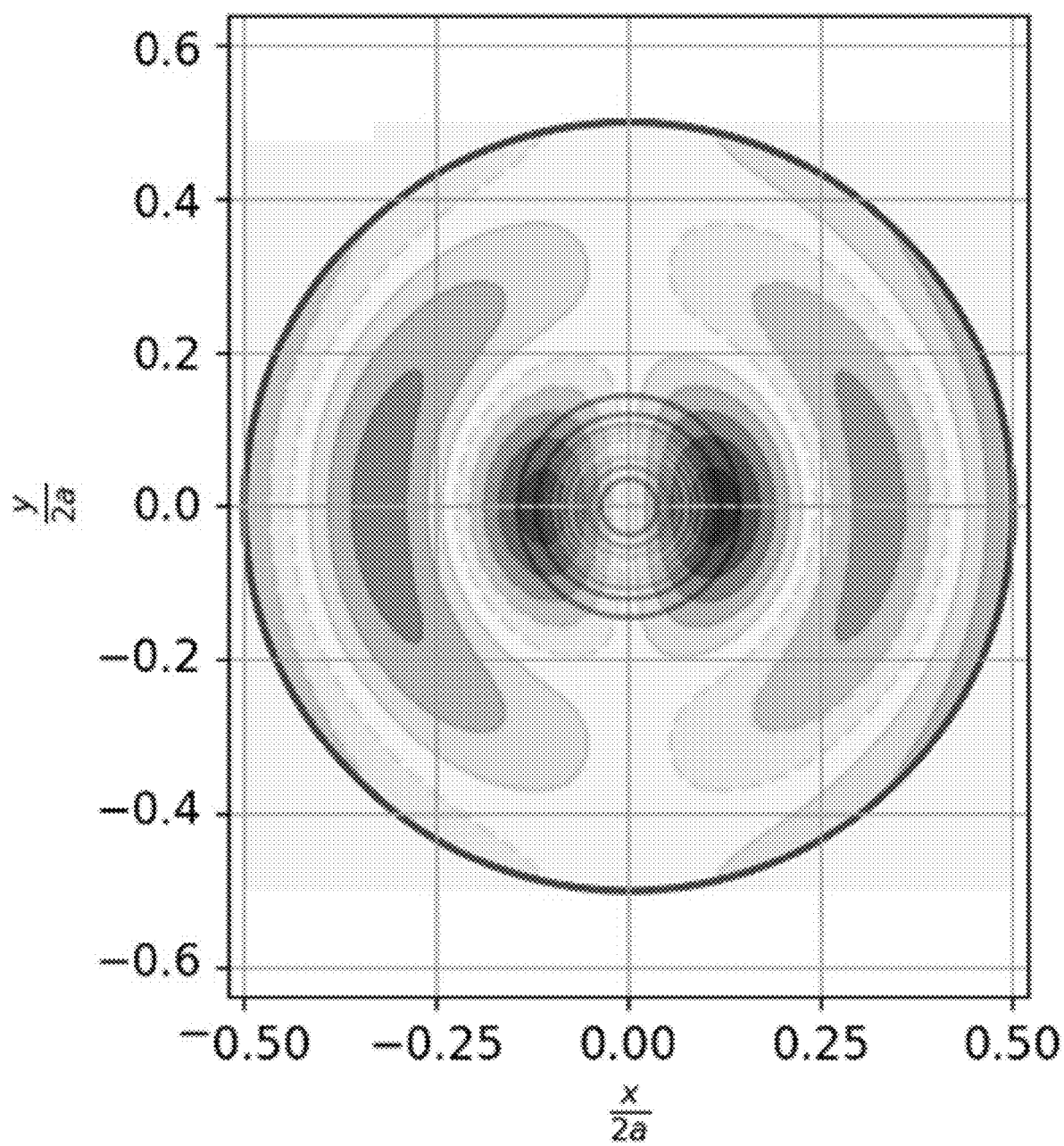
Figure 4C:
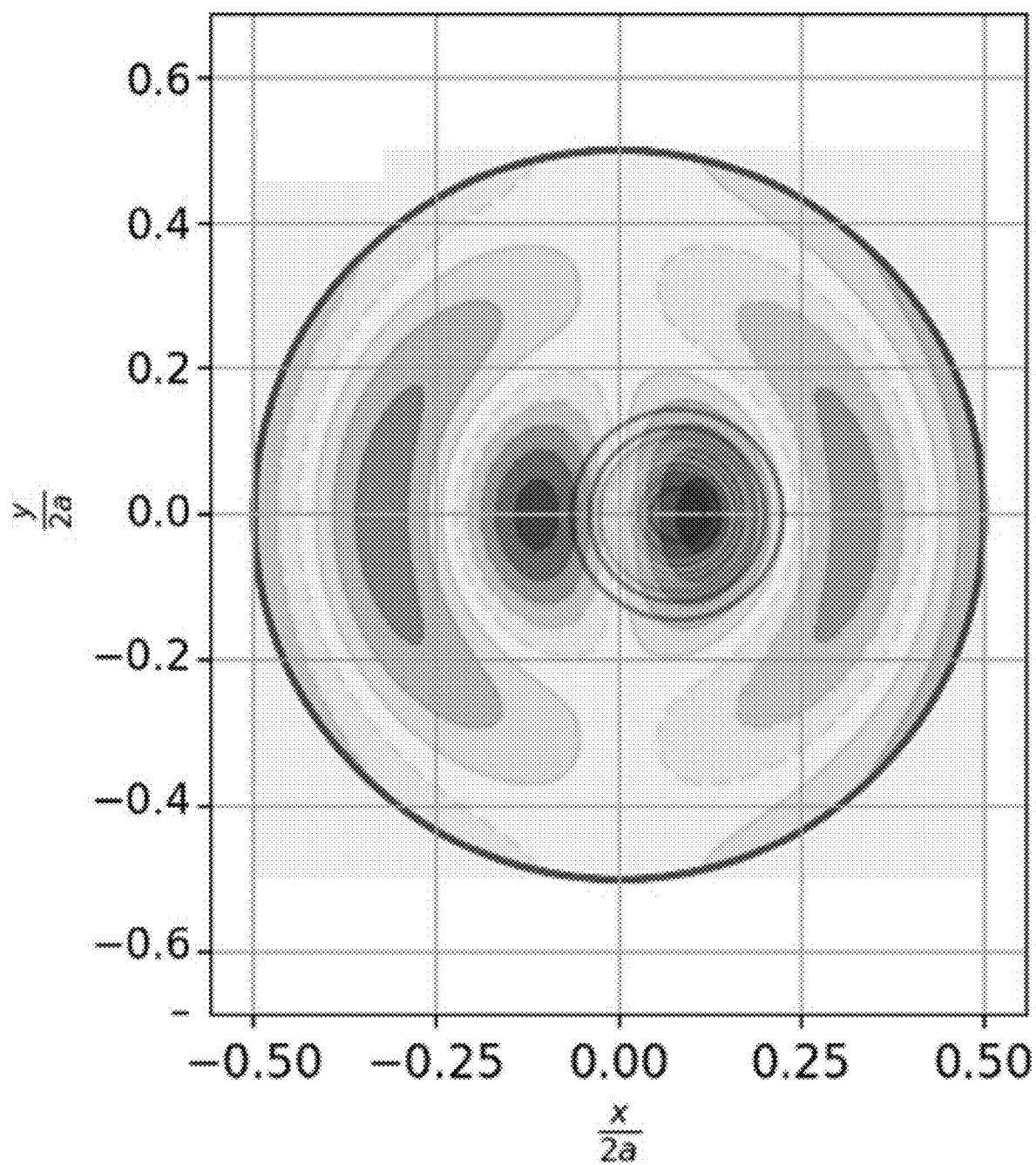
Figure 5A:
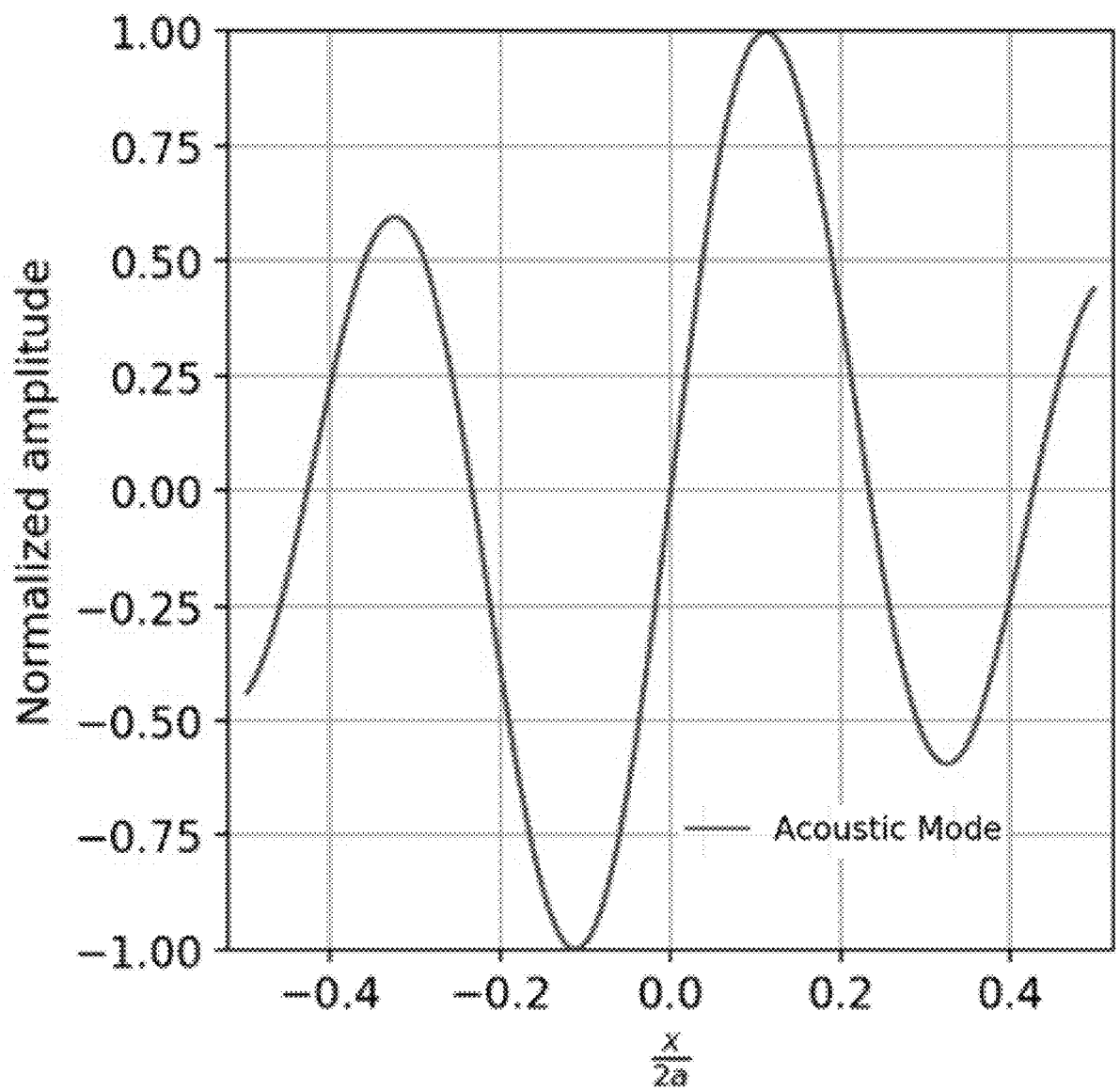
FIG. 5(A), FIG. 5(B), and FIG. 5(C) are plots illustrating.
Figure 5B:
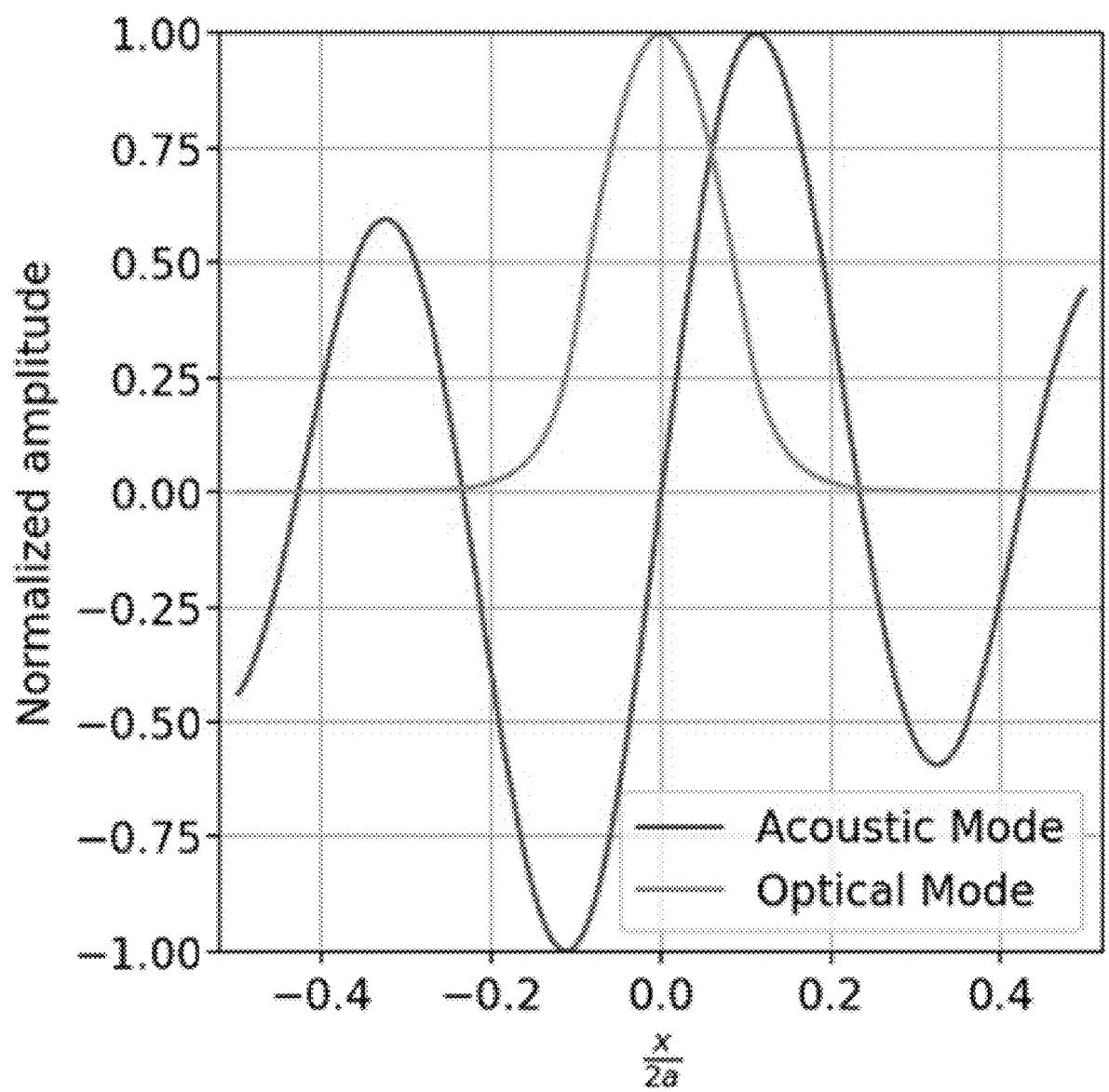
Figure 5C:
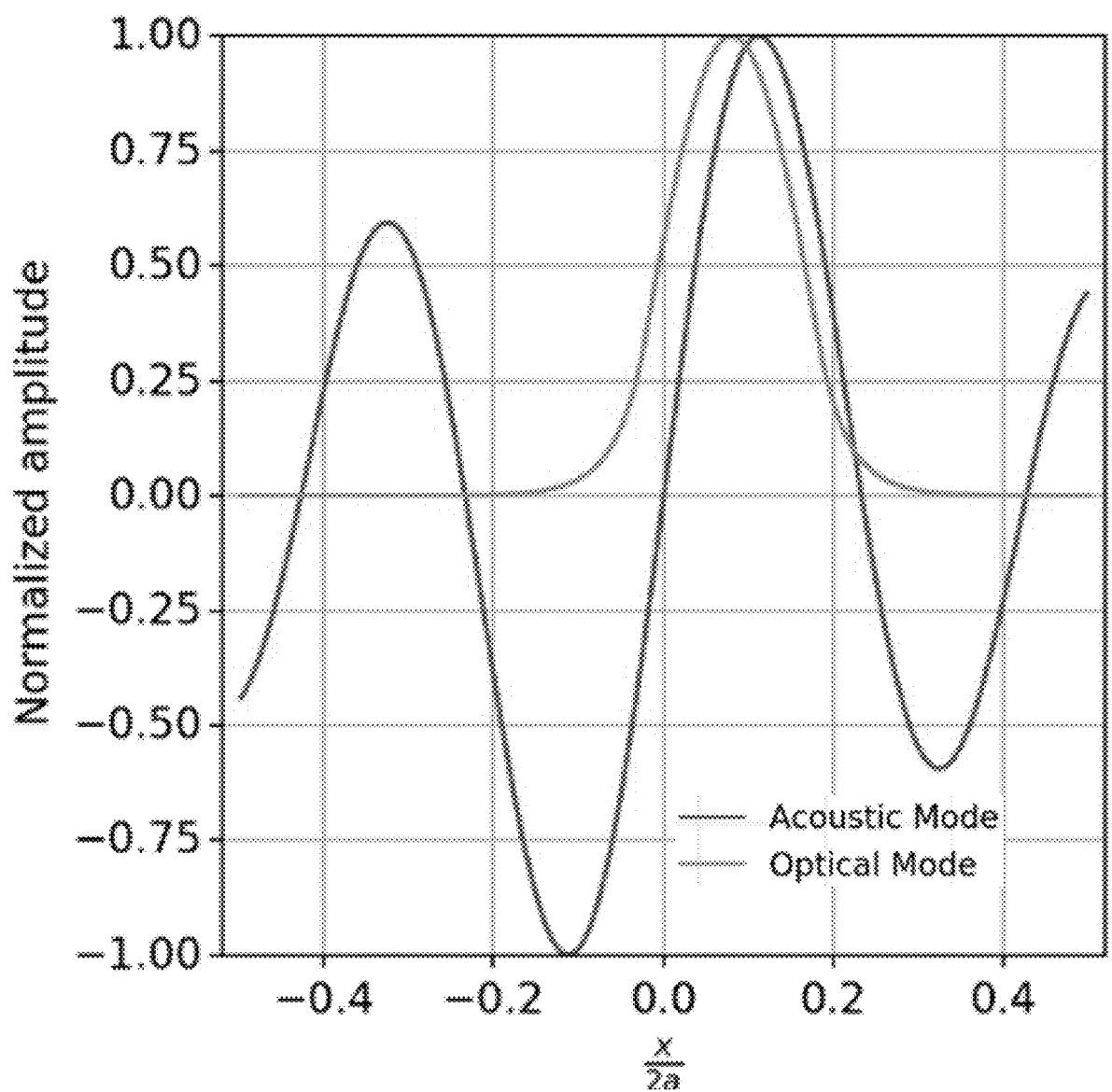

FIG. 4(A) shows the strain component ($s_{rr}+s_{\varphi\varphi}$) that is created by $TR_{1m}$ mode with m =12. The overlap integral of this strain component with the optical mode square is responsible for GAWBS peaks due to pure phase modulation. FIG. 4(B) shows what would the overlap of this strain component with the optical mode would look like for a fiber with an effective area of 150 μm$^2$ if the core was exactly at the center of the cladding. It can be see that in that case the overlap integral would vanish as the strain component is perfectly anti-symmetric around x=0, while the optical mode is symmetric. FIG. 4(C) shows the same case as FIG. 4(B), except CCCE=5 μm in the direction of positive x-axis. To make this point even more clear, FIG. 5(A) and FIG. 5(B) and FIG. 5(C) shows the same except that it is a slice at y=0, with the blue line showing the strain component and the yellow showing the optical mode. Clearly, $TR_{1m}$ modes can only induce GAWBS noise only when CCCE is non-zero.

Example Measurement Results

Figure 6:
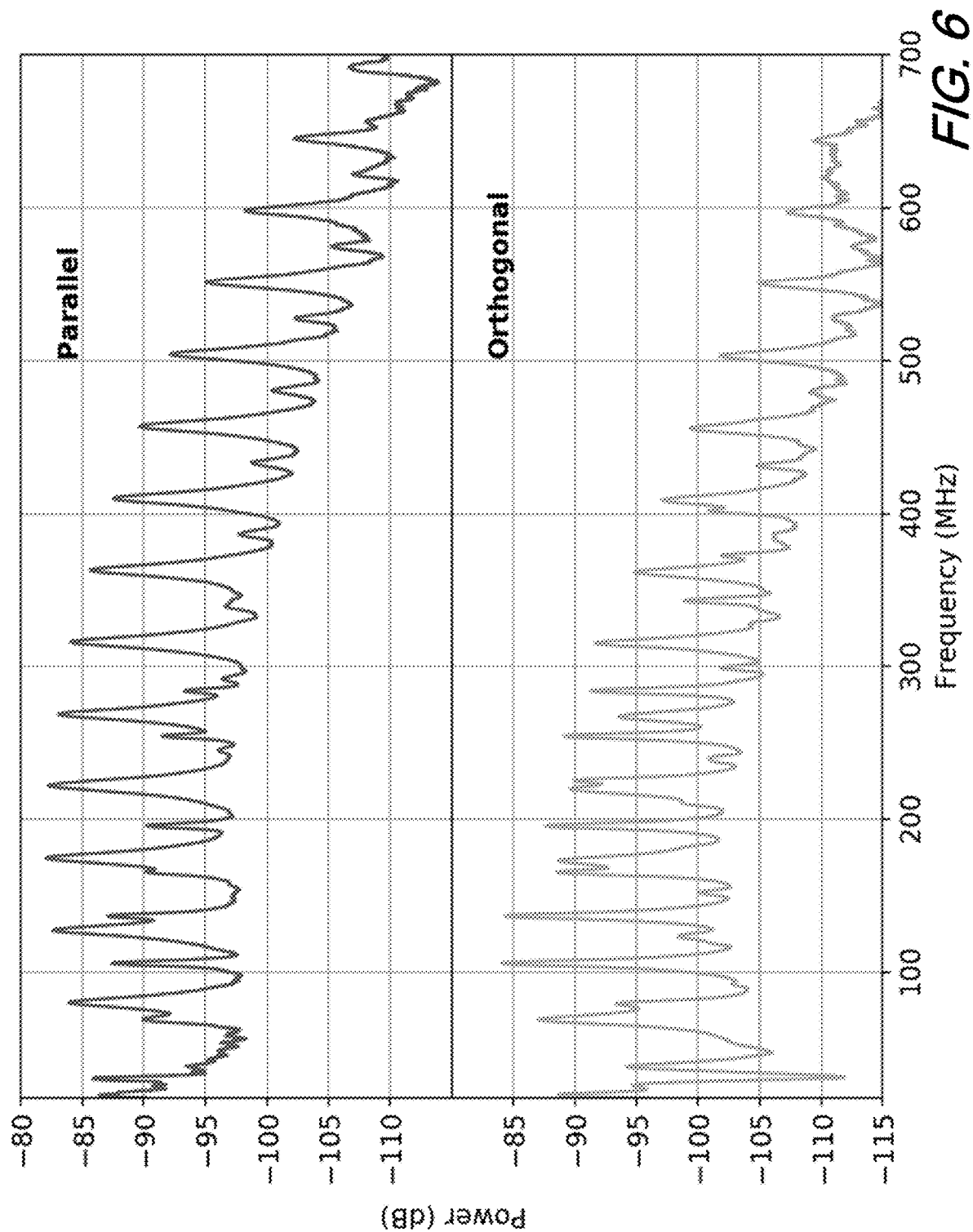
FIG. 6 is a pair of plots illustrating measured GAWBS spectra for parallel component (top) and orthogonal component (bottom) for a Fiber-A according to aspects of the present disclosure.

We have measured GAWBS spectrum for two fibers, Fiber-A and Fiber-B. Fiber-A has CCCE that can be measured by GAWBS. Fiber-B has CCCE that is low enough that it cannot be determined by GAWBS. FIG. 6 shows the GAWSB spectra measured for Fiber-A. The top graph shows the GAWBS spectrum that is in parallel polarization with the carrier, whereas, the lower graph shows the spectra in the orthogonal polarization. As explained above, the orthogonal polarization has only contribution from modes that create birefringence such as the $TR_{2m}$ modes independent of CCCE and also from $TR_{1m}$ modes but only when there is large CCCE.

As explained previously, since the modes that create birefringence create a third of their power in the parallel polarization which is just jhalf of the orthogonal contribution. Therefore, by subtracting half the power of the orthogonal GAWBS spectrum shown in the bottom half of FIG. (6) from that of the parallel GAWBS which at the top graph, we can remove all the contributions in the parallel GAWBS that are originating from $TR_{2m}$ modes and also the contribution of $TR_{1m}$ modes due to birefringence modulation. What would remain in the parallel spectrum is the contributions from the $R_{0m}$ modes and pure phase noise contribution from the $TR_{1m}$, modes.

Figure 7:
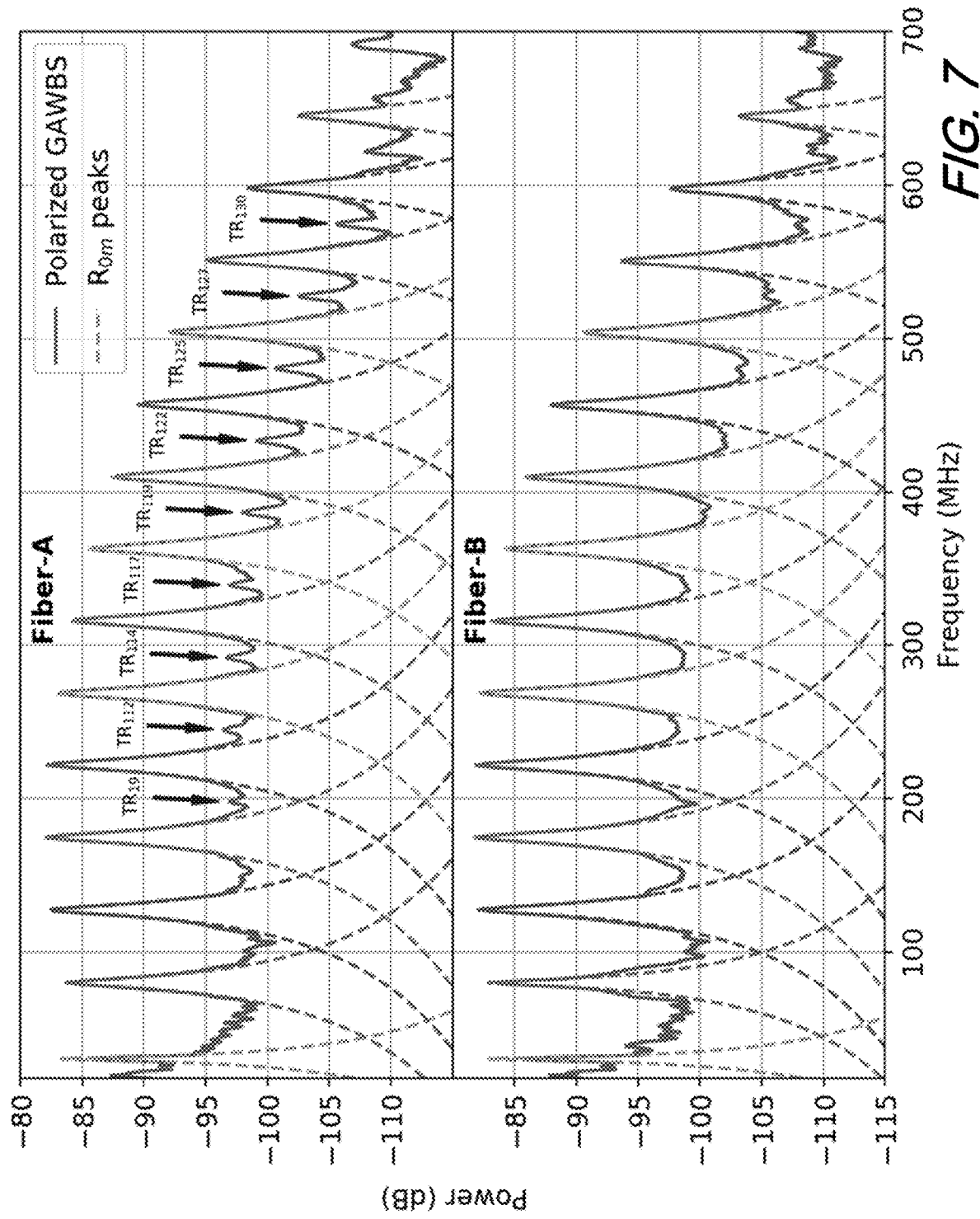
FIG. 7 is a pair of plots illustrating measured polarized GAWBS spectra for Fiber-A (top) and Fiber-B (bottom) in which dashed lines show Lorentzian fitted $R_{0m}$ modes and each corresponds to a different mode, i.e. a different m value, and for Fiber-A, the $TR_{1m}$ modes (m=9 to 30) are clearly visible whereas they are barely noticeable for Fiber-B, according to aspects of the present disclosure.
Figure 8:
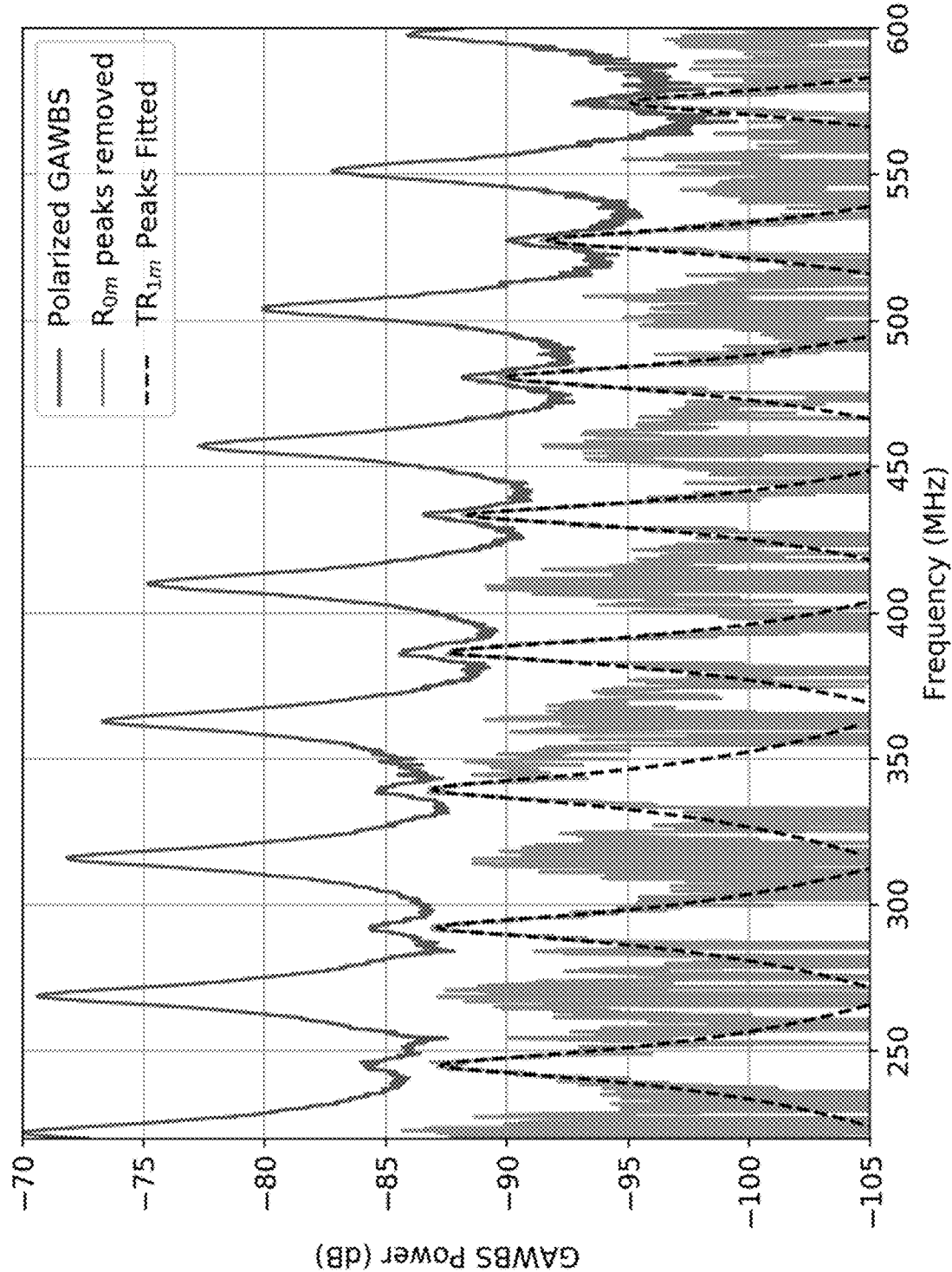
FIG. 8 is a plot illustrating measured polarized GAWBS spectra for Fiber-A before and after removing GAWBS peaks created by $R_{0m}$ modes wherein the $TR_{1m}$ modes with m=12, 14, 17, 19, 22, 25, 27, and 30 are fitted with a Lorentzian shape, according to aspects of the present disclosure.

After subtracting half of the orthogonal GAWBS noise from the parallel GAWBS noise what remains is the polarized GAWBS noise as shown in FIG. 7) for Fiber-A on top and Fiber-B on the bottom. For small CCCE, the GAWBS spectrum is dominated by $R_{0m}$ modes. Fortunately these modes are very clearly separated and they are broadened in a nice Lorentzian shape. Each of these peaks can be fitted with a Lorentzian shape as shown with the dashed lines in FIG. (7). As it can be seen for Fiber-A what remains is the $TR_{1m}$ modes clearly visible. $TR_{1m}$ modes with m=9, 12, 14, 17, 19, 22, 25, 27, and 30 are pointed with arrows which are clearly noticeable. Other $TR_{im}$ modes do not have large enough overlap with the optical mode to be noticeable.

Finally, since the $R_{0m}$ modes are so nicely fitted, we can subtract these modes from the polarized spectrum to leave only the $TR_{1m}$ modes which is shown in FIG. (8) where the line is the same as in top half of FIG.(7). The other line shows what remains after removing the GAWBS peaks from the $R_{0m}$ modes. Even though the $R_{0m}$ modes are fitted very well, the small difference still is comparable in magnitude to the $TR_{1m}$ peaks. Nevertheless the $TR_{1m}$ modes with m =12, 14, 17, 19, 22, 25, 27, and 30 are clearly distinguishable. These modes similar to the $R_{0m}$ modes are expected to be broadened with a Lorentzian distribution. Therefore these modes are also fitted with a Lorentzian distribution individually as shown by the dashed black lines in FIG. (8). Finally the total power in these modes are calculated by integrating the area under them.

This is necessary because the model developed above does not take into account the impact of broadening caused by the damping induced by the polymer coating. The theory only estimated the total power of each GAWBS peak. At this point we can compare the measurement result which is the total power contained in the $TR_{1m}$ modes to what is expected from the theory. It should be noted that this comparison does not need to be done in absolute sense but it could be done relative to the power created by for instance the $R_{0m}$ modes.

Figure 9:
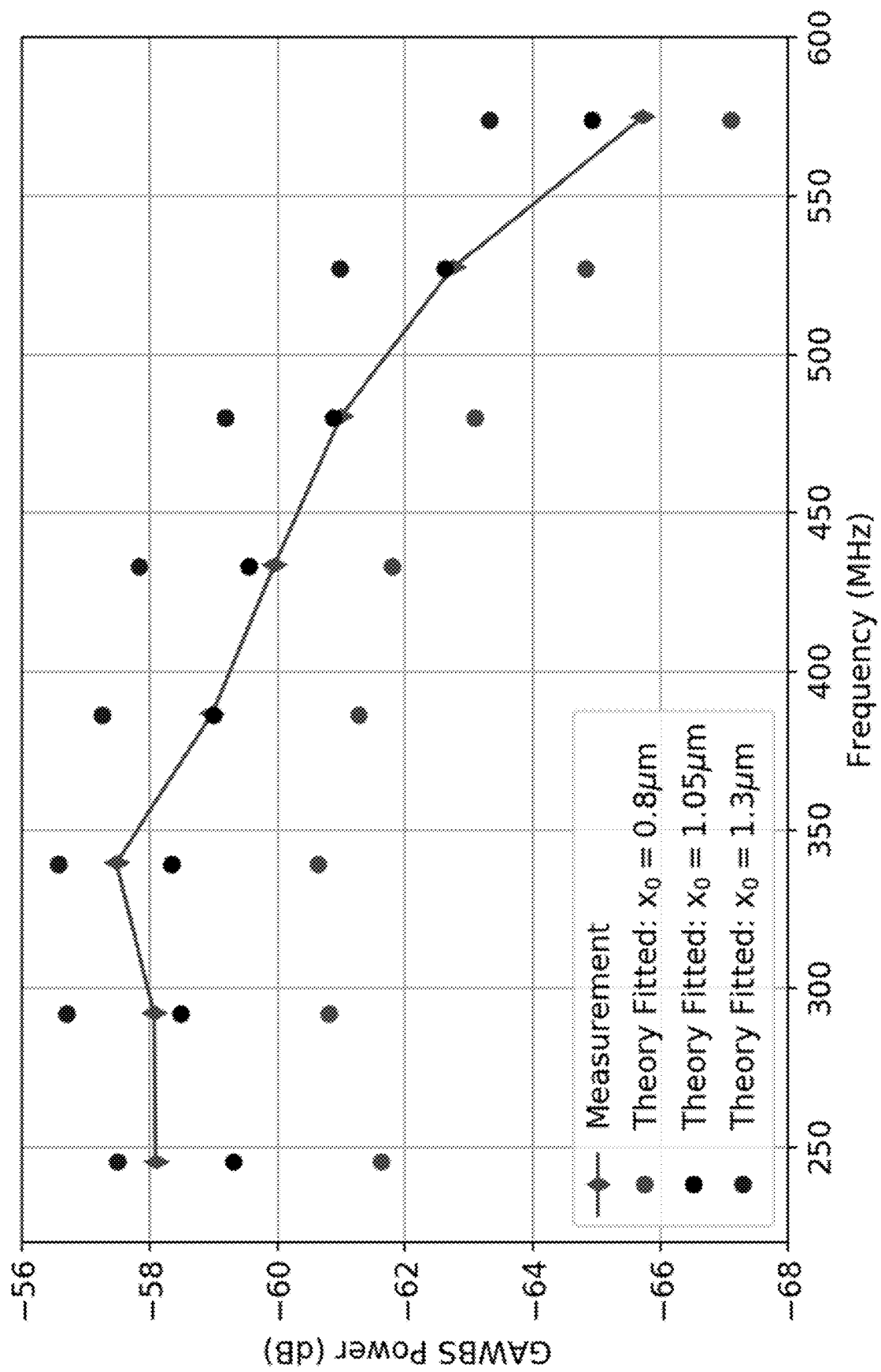
FIG. 9 is a plot illustrating measured polarized GAWBS power corresponding to $TR_{1m}$ modes with m=12, 14, 17, 19, 22, 25, 27, and 30 for Fiber-A wherein the polarized GAWBS power corresponding to $TR_{1m}$ modes is calculated by theory assuming CCCE=$x_0$=0.8, 1.05 and 1.3 µm, according to aspects of the present disclosure.

FIG. 9) shows the GAWBS noise power created by each of the $TR_{1m}$ modes with m=12, 14, 17, 19, 22, 25, 27 in the polarization parallel to the carrier and compares it with what is expected from the theory assuming difference values of CCCE which in this example is the same as $x_0$. It shows that the best fitting is obtained for CCCE=1.05 µm. By comparing the measurement with the theory we conclude that CCCE can be estimated with an accuracy of ∓∓0.1 µm.

Figure 10:
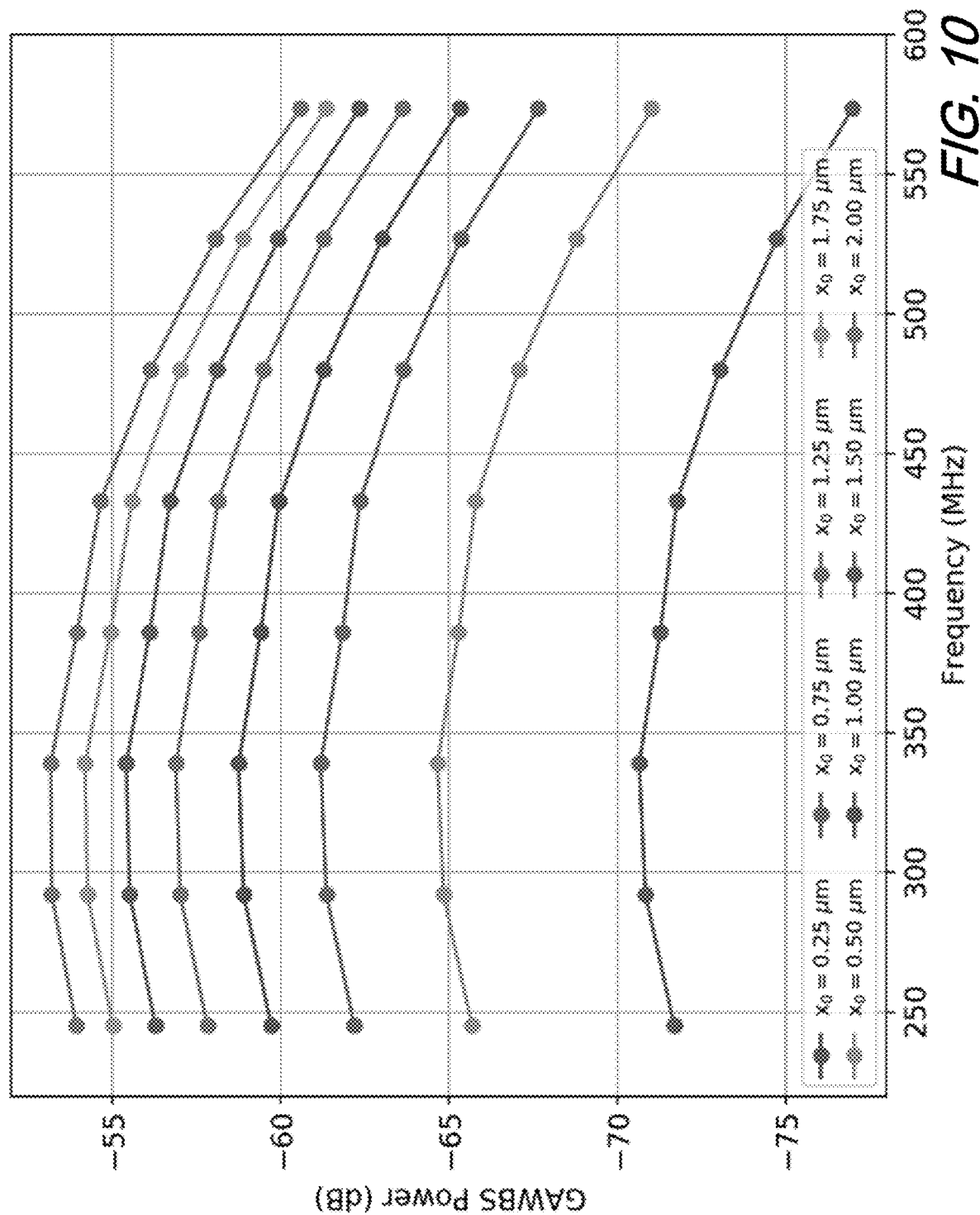
FIG. 10 is a plot illustrating calculated polarized GAWBS power corresponding to $TR_{1m}$ modes with m=12, 14, 17, 19, 22, 25, 27, and 30 for a fiber with an effective area of 150 µm$^2$, for various values of CCCE=$x_0$, according to aspects of the present disclosure.

FIG. 10 shows the calculated value of GAWBS noise power created by each of the $TR_{1m}$ modes with m=12, 14, 17, 19, 22, 25, 27 in the polarization parallel to the carrier for different values of CCCE. It shows that for range of small CCCE values that are of interest, the overall shape remains roughly the same but the magnitude increases monotonically with increasing CCCE. A saturation is observed at higher CCCE but after that point strong changes in the overall shape is observed. It should also be noted that for smaller values of CCCE less than 0.5 µm it would be challenging to determine the CCCE with this method as the $TR_{1m}$ peaks would be buried beneath the $R_{0m}$ modes and disentangling the contributions of these mode sets would require very high sensitivity measurements. It should be noted that the same procedure could be repeated for the orthogonal GAWBS spectrum where the $TR_{1m}$ peaks are noticeable among the $TR_{2m}$ peaks that create the orthogonal GAWBS.

Figure 11A:
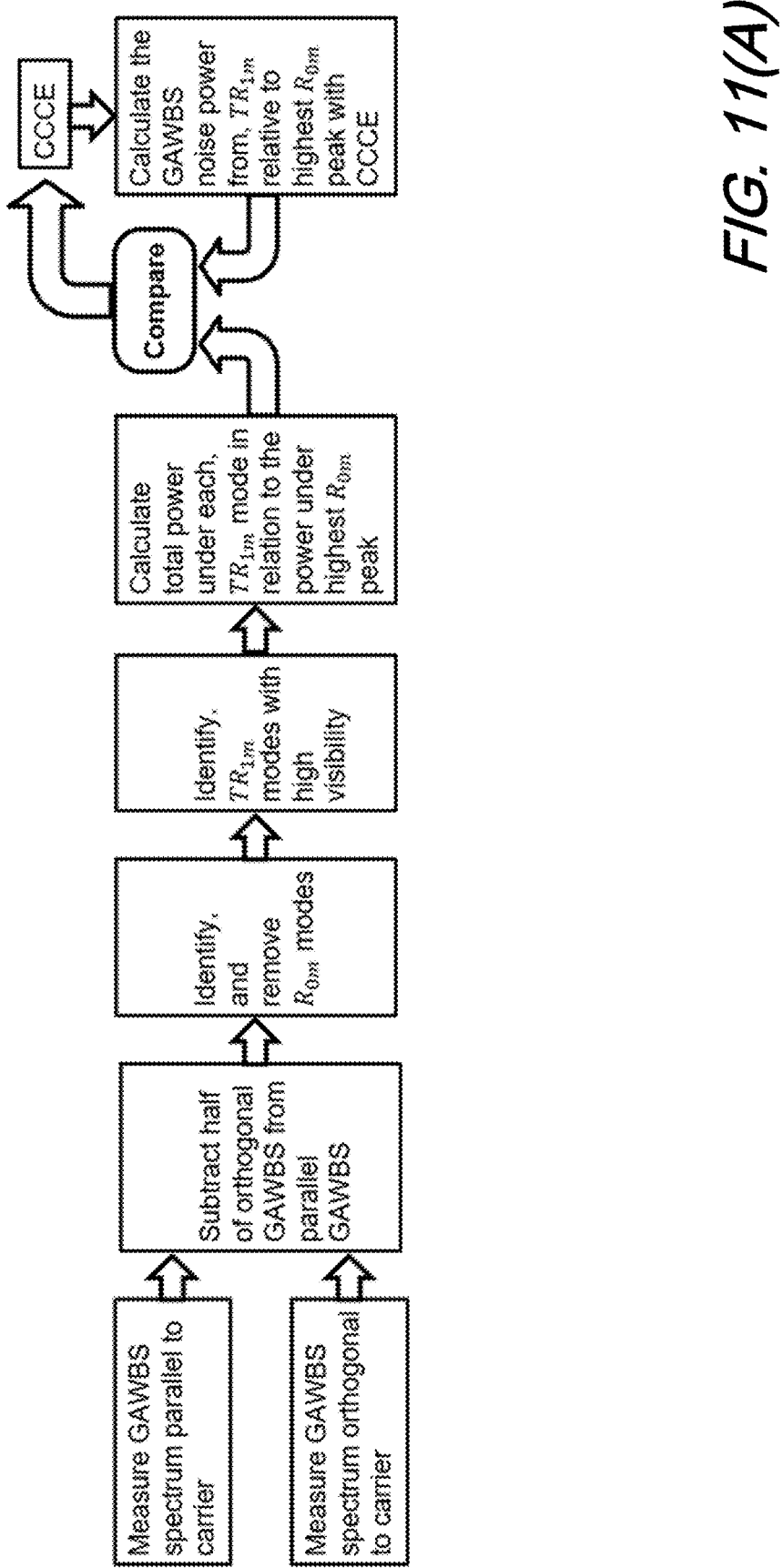
Figure 11B:
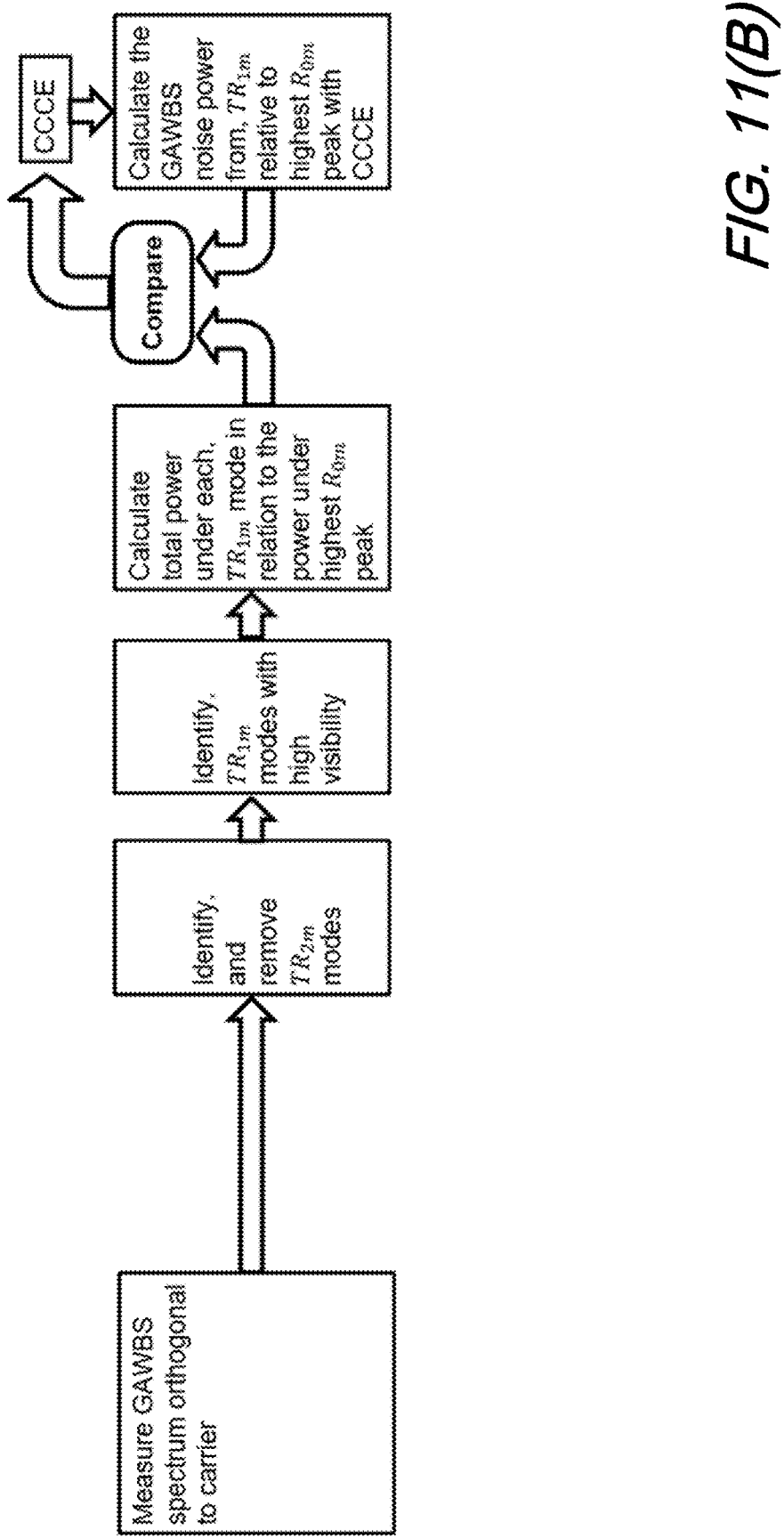

FIG. 11(A) and FIG. 11(B) summarize the steps used for preparation of the measured GAWBS spectra and fitting the theory and the measurement to find the best estimate for the CCCE value. FIG. 11(A) shows the procedure when both the parallel and orthogonal GAWBS spectra are used, and FIG. 11(B) shows when only the orthogonal GAWBS spectrum is used. The two procedures have advantages and disadvantages which can make them suitable for different circumstances. For instance if the measurements are expected to be corrupted by the receiver noise floor, it might be better to use both spectra as it has higher power. However if the measurements are expected to be corrupted more by laser phase noise it might be better to use only the orthogonal spectra as it can avoid laser phase noise since laser phase noise is in parallel polarization to the carrier. The latter procedure is also simpler.

As those skilled in the art will now understand and appreciate, there are major advantages to our inventive method described herein. First, the average value of CCCE can be measured for a very long fiber span which can be 10s of kms in a single shot measurement. In prior art, in order to know what CCCE for a long fiber, one needs to measure it at many locations along the fiber span, or make sure that a single measurement is representative of the entire length.

Second, the measurement in this invention is very simple. The same set up can be used to measure many different fiber types or samples with no preparation at all. For instance, no removal of fiber polymer coating, no cleaving with high accuracy, and associated requirements on cleanliness procedures etc. Another example is that prior art required one to find out which direction the core-cladding offset occurs and make the measurement in that direction, or make multiple measurements from different directions, or scanning by rotation etc. In our invention no matter what the direction of the offset is the value of CCCE would be the same.

At this point, while we have presented this disclosure using some specific examples, those skilled in the art will recognize that our teachings are not so limited. Accordingly, this disclosure should be only limited by the scope of the claims attached hereto.

The invention claimed is:

1. A computer implemented method for estimating core-cladding concentricity error (CCCE) in an optical fiber, the method comprising:
by the computer:
measuring at least one of a GAWBS spectra in the optical fiber selected from the group consisting of a GAWBS spectra parallel to a carrier, parallel GAWBS, and a GAWBS spectra orthogonal to the carrier (orthogonal GAWBS), a using a homodyne measurement technique in which a measurement laser is also a local oscillator;
subtracting half of the orthogonal GAWBS from the parallel GAWBS producing a subtracted GAWBS spectra;
identifying and removing any $R_{0m}$ modes from the subtracted GAWBS spectra producing a $R_{0m}$ removed GAWBS spectra;
iidentifying certain $TR_{1m}$ in the $R_{0m}$ removed GAWBS spectra and determining a total power under each $TR_{1m}$ mode in relation to a power under a highest $R_{0m}$ peak;
estimating the CCCE in the optical fiber by comparing $R_{0m}$ with $TR_{1m}$; and
outputting an indicium of the estimated CCCE.

* * * * *